(12) United States Patent
Dettler et al.

(10) Patent No.: US 11,898,691 B2
(45) Date of Patent: Feb. 13, 2024

(54) ARRAY MOUNTING ASSEMBLY

(71) Applicant: Latch Systems, Inc., New York, NY (US)

(72) Inventors: Andre Dettler, Brooklyn, NY (US); Tim Stonelake, New York, NY (US)

(73) Assignee: Latch Systems, Inc., New York, NY (US)

( * ) Notice: Subject to any disclaimer, the term of this patent is extended or adjusted under 35 U.S.C. 154(b) by 0 days.

(21) Appl. No.: 18/071,953

(22) Filed: Nov. 30, 2022

(65) Prior Publication Data

US 2023/0167943 A1 Jun. 1, 2023

Related U.S. Application Data

(60) Provisional application No. 63/284,277, filed on Nov. 30, 2021.

(51) Int. Cl.
*F16M 13/02* (2006.01)
(52) U.S. Cl.
CPC .................................. *F16M 13/02* (2013.01)
(58) Field of Classification Search
CPC .............................. F16M 13/02; F16B 5/0607
USPC ............................... 248/231.91; 52/27, 309.1
See application file for complete search history.

(56) References Cited

U.S. PATENT DOCUMENTS

| 4,204,376 A | * | 5/1980 | Calvert | A47K 3/008 |
| | | | | 52/309.1 |
| 8,528,264 B1 | * | 9/2013 | Thut | F16B 21/02 |
| | | | | 52/27 |
| 9,810,253 B2 | * | 11/2017 | Koelling | F16B 12/22 |
| 11,067,218 B2 | * | 7/2021 | Sisto | F16B 35/005 |

FOREIGN PATENT DOCUMENTS

| EP | 2997565 B1 | 9/2019 |
| GB | 1186222 A | 4/1970 |

OTHER PUBLICATIONS

International Search Report and Written Opinion for Application No. PCT/US22/51359, dated Mar. 8, 2023, 6 pages.

* cited by examiner

*Primary Examiner* — Todd M Epps
(74) *Attorney, Agent, or Firm* — KDW Firm PLLC

(57) ABSTRACT

A versatile wall mounting assembly is disclosed. The assembly may include a first section extending parallel to a wall structure, a second section extending from the first section, wherein the second section includes a free end, and a third section extending from the first section. The third section may be oriented perpendicular to the first section. The assembly may further include a faceplate couplable with the wall plate, the faceplate including an outer side opposite an inner side, wherein a plurality of ridges extend towards the wall plate from the inner side. The plurality of ridges may include a first ridge in abutment with the second section of the wall plate, a second ridge in abutment with the second section of the wall plate, and a third ridge extending beneath the third section of the wall plate.

20 Claims, 35 Drawing Sheets

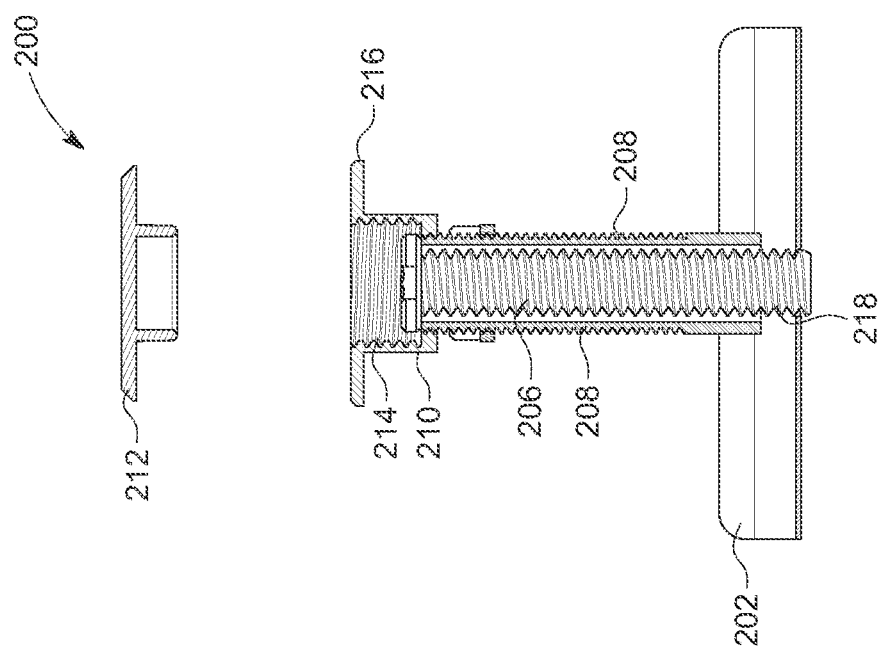

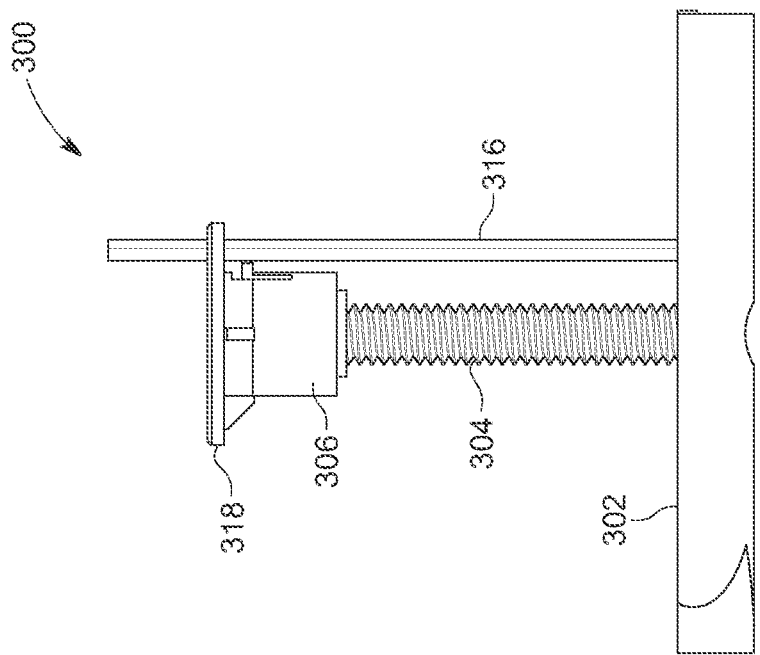
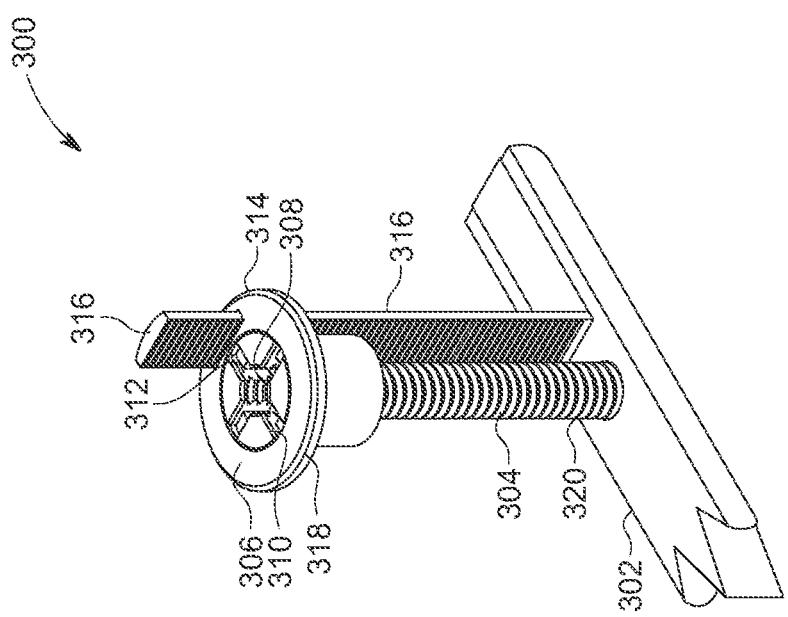
FIG. 3A
FIG. 3B

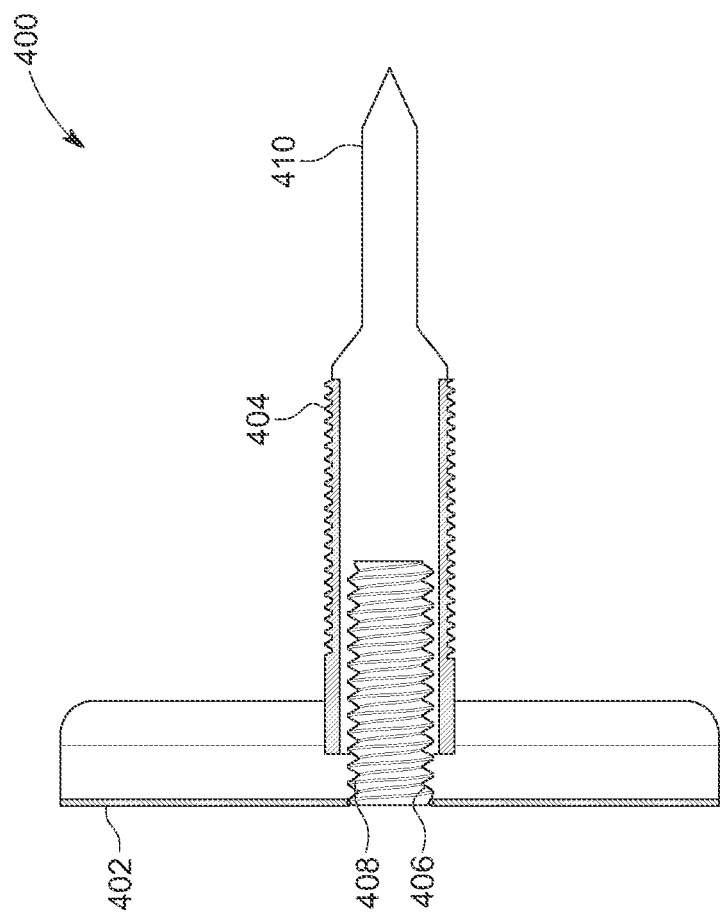

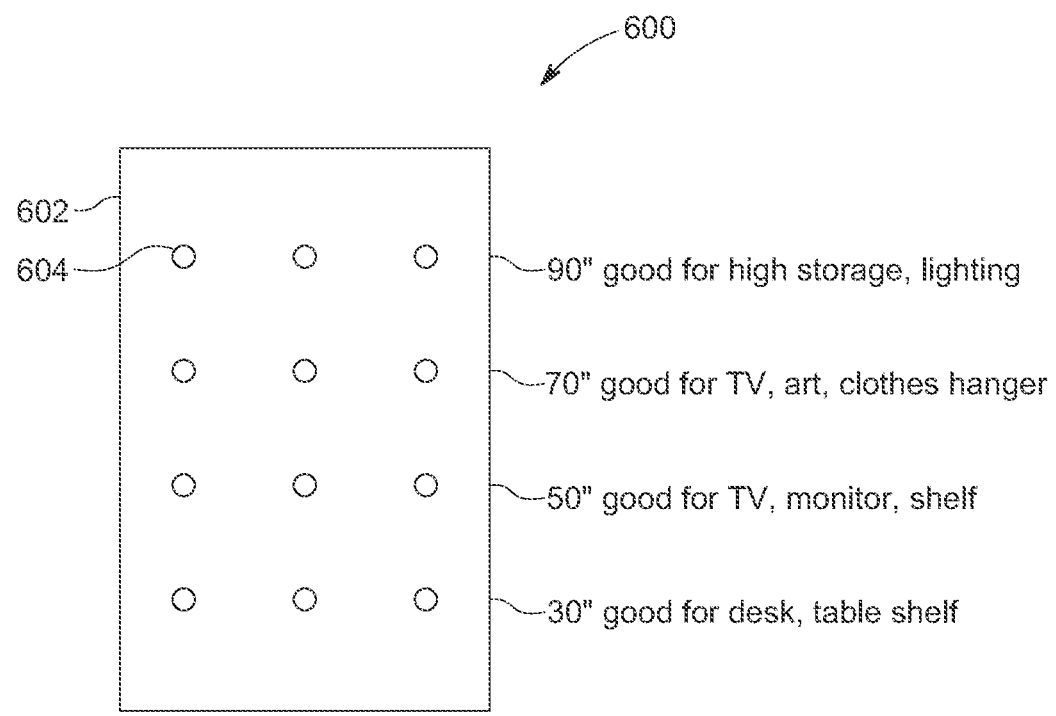
FIG. 6A
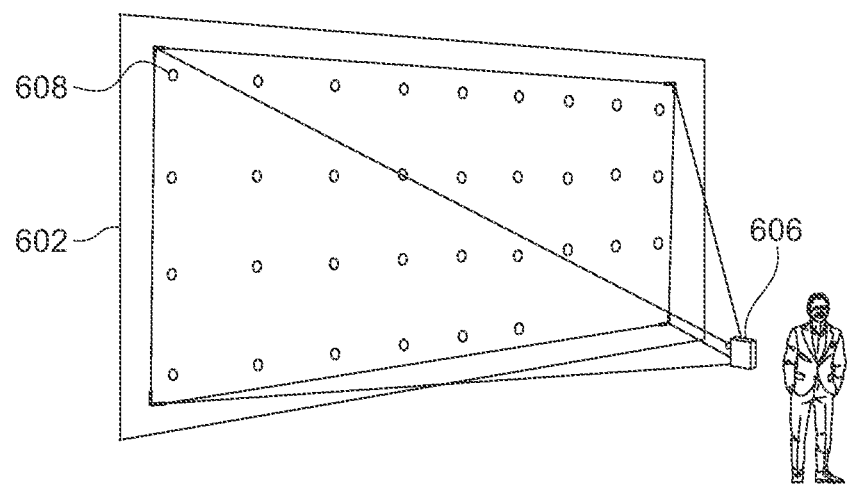
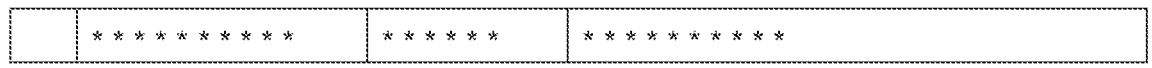
FIG. 6B

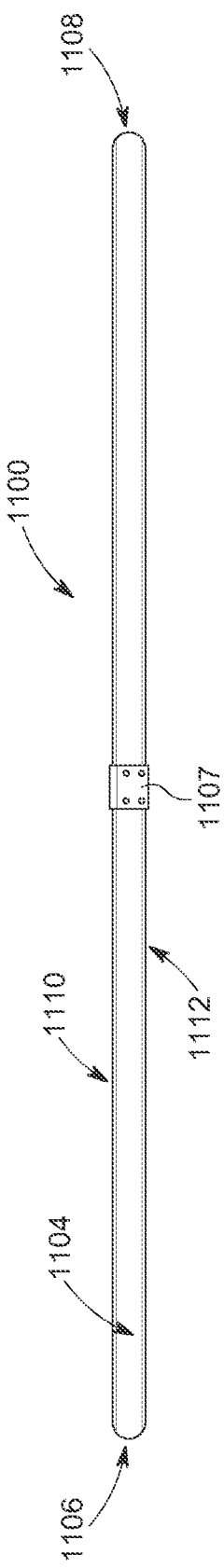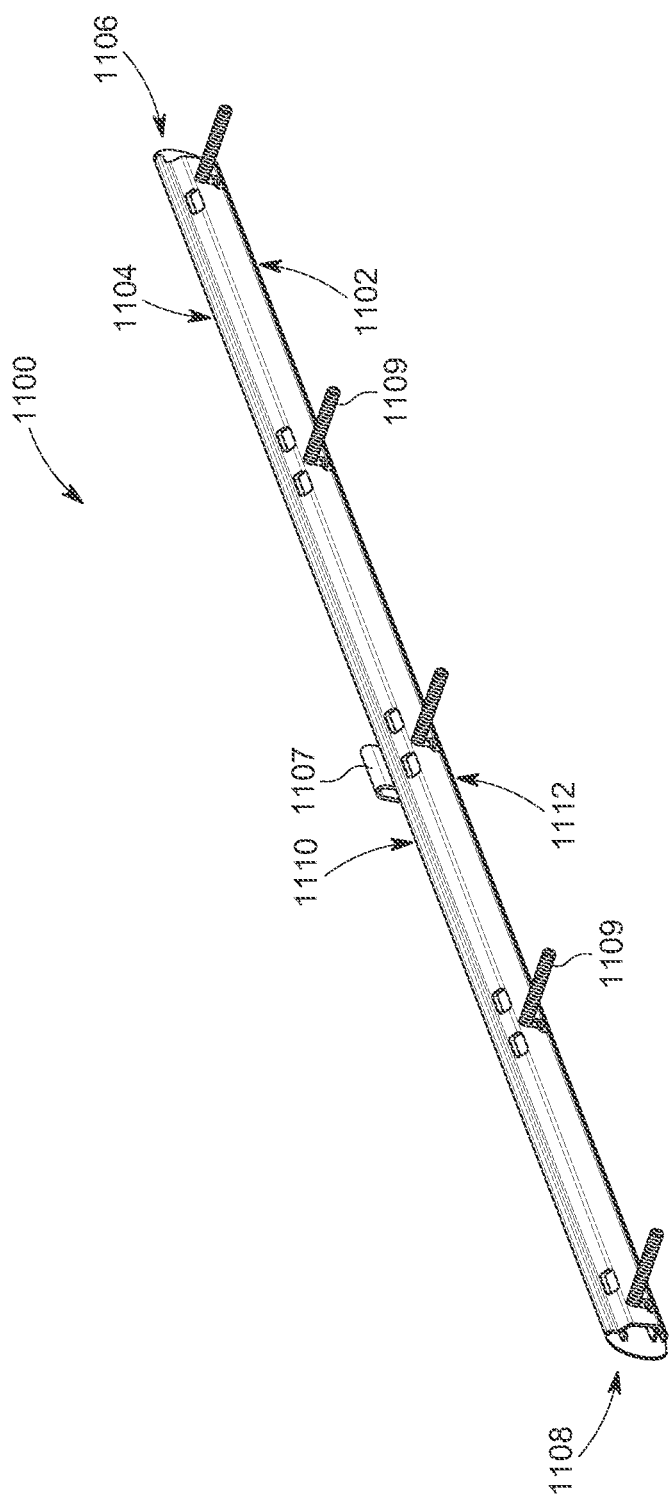
FIG. 11A
FIG. 11B

FIG. 19B

FIG. 19C

ARRAY MOUNTING ASSEMBLY

CROSS-REFERENCE TO RELATED APPLICATIONS

This application claims the benefit of the filing date of U.S. Provisional Application Ser. No. 63/284,277, filed Nov. 30, 2021, the entire contents of which is incorporated herein by reference.

TECHNICAL FIELD

Embodiments of the present disclosure generally relate to mounting assemblies. More particularly, embodiments of the present disclosure relate to wall mounting assemblies.

BACKGROUND

Many mounting assemblies exist for securing an object to a wall, ceiling, or other support structure. FIGS. 1A and 1B illustrate examples of prior art toggle bolt systems 100a and 100b. The illustrated toggle bolt systems 100a and 100b are fasteners generally used to hang objects on hollow walls, such as drywall. In the illustrated example, the toggle 102 may be inserted into a hole in the wall and then pivot and spring open, expanding the surface area contacting the backside of the wall. Thus, the toggle 102 clamps to the wall with fastener 114, increasing the holding capacity of a section of the wall compared to friction fit or large pitch threaded drywall anchors.

To insert the toggle 102 into the wall, the toggle 102 may be configured parallel to the strap 104 and pushed or inserted into a hole in the wall made by a drill. In the configuration illustrated in FIG. 1A, the toggle bolt system 100a includes a spring 110 that may cause the toggle 102 to open and become parallel to a backside surface of the wall and the strap 104. The cap 106 may be slid down the strap 104 to engage and be inserted into the hole in the wall. The cap 106 may include a cap flange 108 configured to engage the outer surface of the wall. The cap 106 may include a one-way snap feature that engages the strap 104 similar to cable ties. The portion of the strap 104 outside of the cap flange 108 of the cap 106 may be snapped or cut off and discarded as waste. To fasten an object to the wall, a screw 114 or bolt may be inserted through the object and secured into a threaded hole 112 of the toggle 102.

In FIG. 1B, the strap 104 may be configured and attached to the toggle 102 such that when the toggle 102 is inserted into the wall, the strap 104 may be pulled to turn the toggle 102 to become perpendicular to the inner surface of the wall.

The problem with the prior art toggle bolt systems 100a and 100b are that they are generally one-time use bolts. As a result, when a user detaches an object from the wall by unscrewing the screw 114, the toggle 102 can fall off and behind the wall or could spin freely when loosened, leading to the toggle not being engaged in the proper direction when re-tightened.

Embodiments discussed herein solve this and other problems and will become more apparent in the following description.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

In one approach of the disclosure, an assembly may include a wall plate operable to be secured to a structure, the wall plate including a first section extending parallel to a plane defined by the structure, a second section extending from a first end of the first section, wherein the second section includes a free end, and a third section extending from a second end of the first section, wherein the third section is oriented perpendicular to the first section. The assembly may further include a faceplate removably coupled to the wall plate, the faceplate including an outer side opposite an inner side, wherein a plurality of ridges extend towards the wall plate from the inner side. The plurality of ridges may include a first ridge in abutment with the second section of the wall plate, a second ridge in abutment with the first section of the wall plate, wherein the second ridge extends farther from the inner side than the first ridge, and a third ridge extending beneath the third section of the wall plate.

In another approach of the disclosure, a mounting assembly may include a wall plate operable to be secured to a wall, the wall plate including a first section extending parallel to a plane defined by a surface of the wall, a second section extending from a first end of the first section, wherein the second section includes a free end, and a third section extending from a second end of the first section. The third section may be oriented perpendicular to the first section. The mounting assembly may further include a faceplate removably coupled to the wall plate, the faceplate including an outer side opposite an inner side, wherein a plurality of ridges extend towards the wall plate from the inner side, and wherein the plurality of ridges includes a first ridge in abutment with the second section of the wall plate, a second ridge in abutment with the first section of the wall plate, wherein the second ridge extends farther from the inner side than the first ridge, and a third ridge extending beneath the third section of the wall plate.

In yet another approach of the disclosure, a wall mounting assembly may include a wall plate operable to be secured to a wall, the wall plate including a first section extending parallel to a plane defined by a surface of the wall, a second section extending from a first end of the first section, wherein the second section includes a free end, and wherein the free end is oriented parallel to the first section, and a third section extending from a second end of the first section, wherein the third section is oriented perpendicular to the first section. The wall mounting assembly may further include a faceplate removably coupled to the wall plate, the faceplate including an outer side opposite an inner side, wherein a plurality of ridges extend towards the wall plate from the inner side. The plurality of ridges may include a first ridge in abutment with the second section of the wall plate, a second ridge in abutment with the second section of the wall plate, wherein the second ridge extends farther from the inner side than the first ridge, and a third ridge extending beneath the third section of the wall plate.

In yet another approach of the disclosure, a wall mounting assembly may include a wall plate operable to be secured to a wall, the wall plate including a first section extending parallel to a plane defined by a surface of the wall, a second section extending from a first end of the first section, wherein the second section includes a free end, and wherein the free end is oriented parallel to the first section. The wall mounting assembly may further include a faceplate removably coupled to the wall plate, the faceplate including an outer side opposite an inner side, wherein a plurality of ridges extend towards the wall plate from the inner side. The plurality of ridges may include a first ridge in abutment with the second section of the wall plate, a second ridge in abutment with the first section of the wall plate, wherein the second ridge extends farther from the inner side than the first ridge, and a third ridge extending beneath the bottommost edge of the first section.

BRIEF DESCRIPTION OF THE DRAWINGS

In the drawings, like reference characters generally refer to the same parts throughout the different views. In the following description, various embodiments of the present disclosure are described with reference to the following drawings, in which:

FIGS. 2A-2C illustrate an example embodiment of a toggle bolt system according to embodiments of the present disclosure.

FIGS. 3A-3C illustrate an example of a second embodiment of a toggle bolt system according to embodiments of the present disclosure.

FIG. 4 illustrates an example of a self-drilling anchor according to embodiments of the present disclosure.

FIGS. 6A/6B illustrates an example of an array system configuration according to embodiments of the present disclosure.

FIGS. 11A-11B illustrate an example system/assembly according to embodiments of the present disclosure.

Figures 19B, 19C:
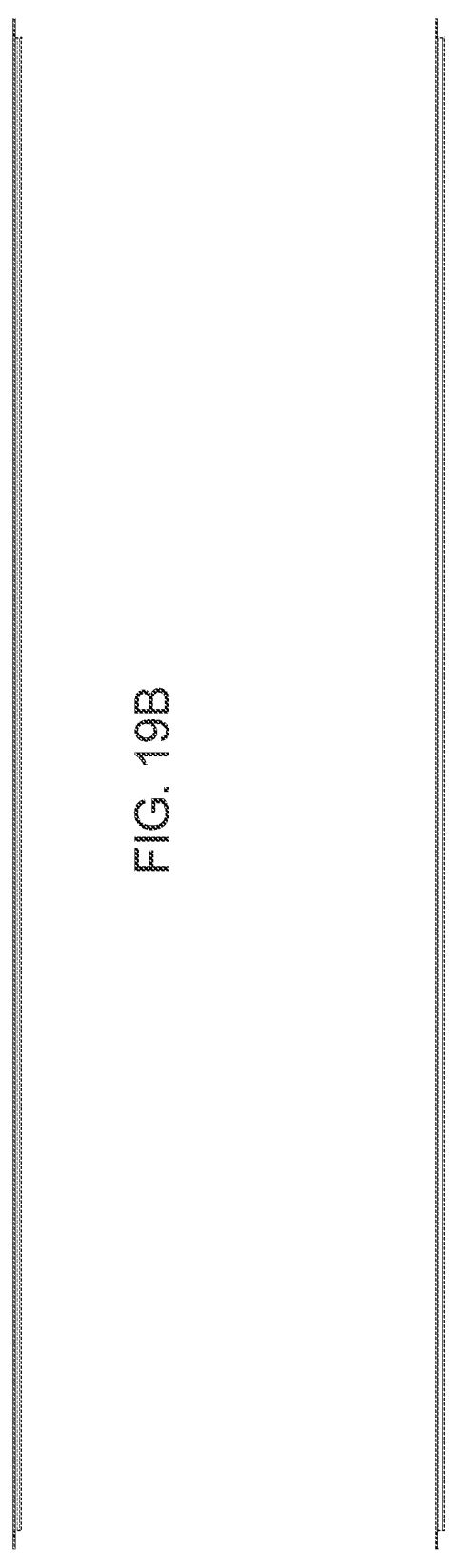

FIGS. 19A-19G demonstrate various views of the faceplate according to embodiments of the present disclosure.

Figure 1A:
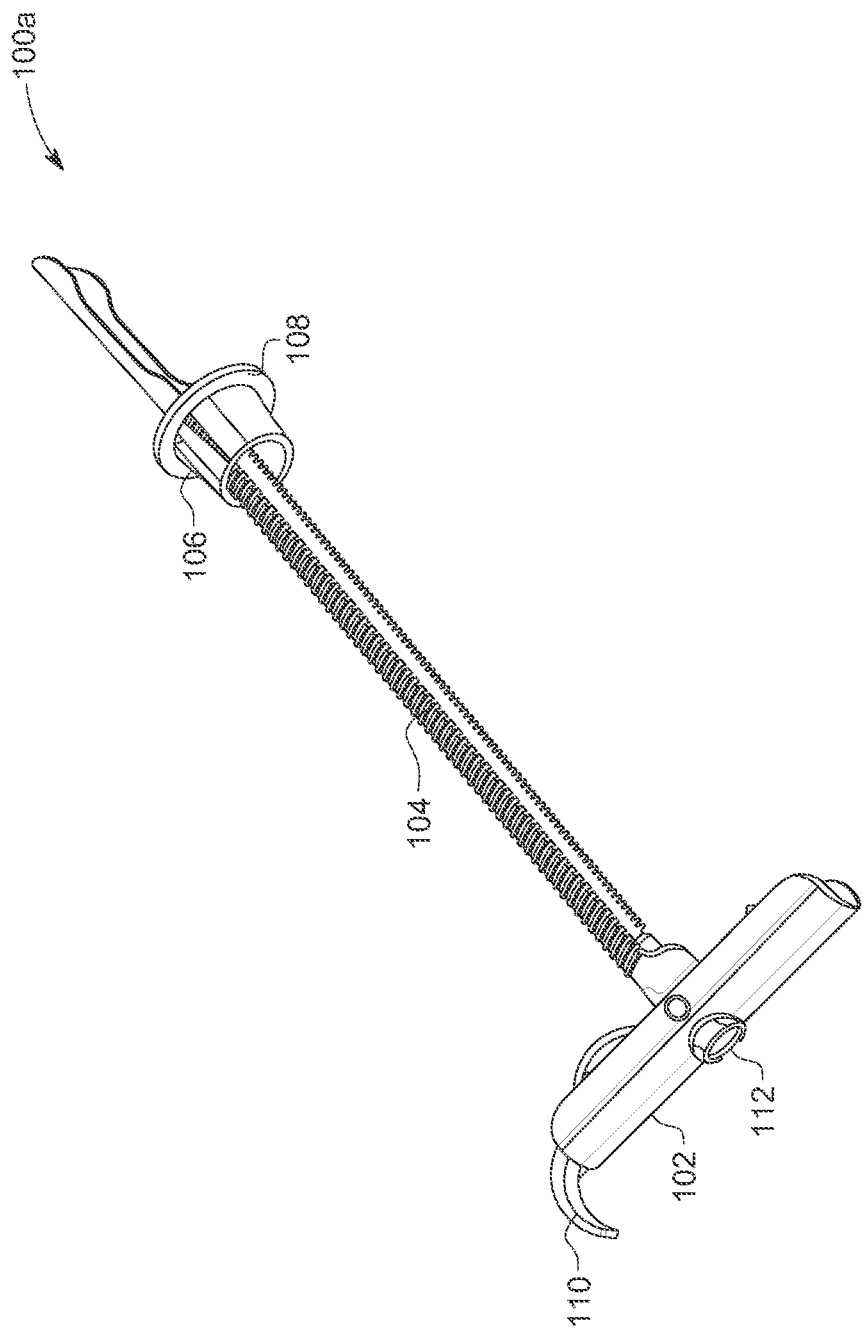
FIG. 1A illustrates an example of a prior art toggle bolt system according to embodiments of the present disclosure.

The drawings are not necessarily to scale. The drawings are merely representations, not intended to portray specific parameters of the disclosure. The drawings are intended to depict exemplary embodiments of the disclosure, and therefore are not to be considered as limiting in scope. In the drawings, like numbering represents like elements.

Furthermore, certain elements in some of the figures may be omitted, or illustrated not-to-scale, for illustrative clarity. The cross-sectional views may be in the form of "slices", or "near-sighted" cross-sectional views, omitting certain background lines otherwise visible in a "true" cross-sectional view, for illustrative clarity. Furthermore, for clarity, some reference numbers may be omitted in certain drawings.

DETAILED DESCRIPTION

The present embodiments will now be described more fully hereinafter with reference to the accompanying drawings, where some embodiments are shown. The subject matter of the present disclosure may be embodied in many different forms and is not to be construed as limited to the embodiments set forth herein. These embodiments are provided so this disclosure will be thorough and complete, and will fully convey the scope of the subject matter to those skilled in the art. In the drawings, like numbers refer to like elements throughout.

Figure 2A:
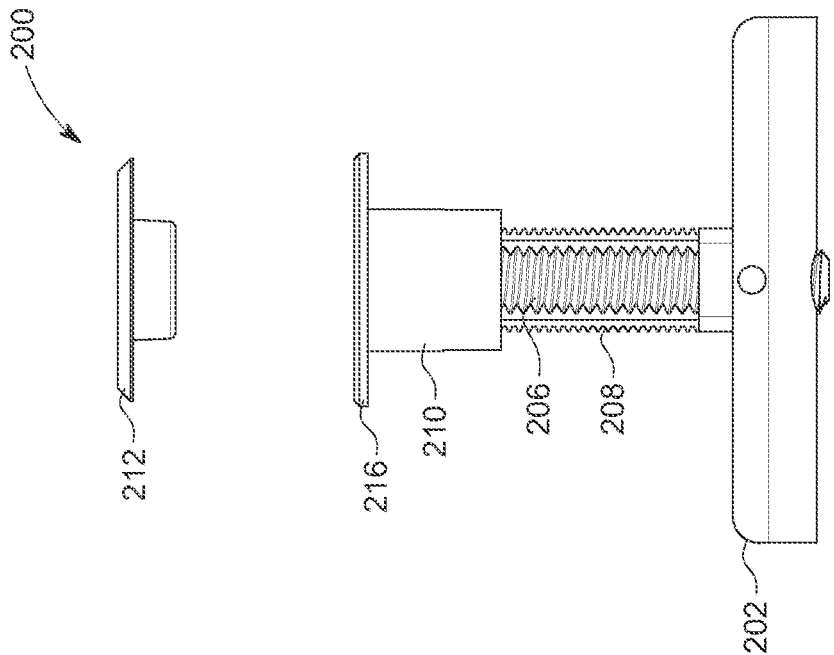
Figure 2B:
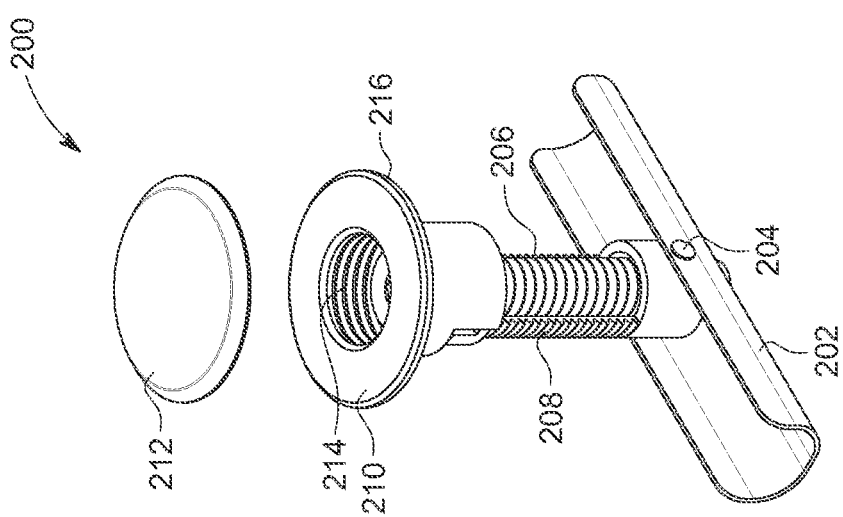

FIGS. 2A, 2B, and 2C illustrate an example embodiment of a toggle bolt system 200, including a cap 210 configured with threads 214 to operate as a nut to accept a threaded portion of a bolt. In other words, the cap 210 including the threads 214 may be a nut for a bolt or screw configured to hold another object to a surface. FIG. 2A illustrates an isometric view of the toggle bolt system 200, FIG. 2B illustrates a side view of the toggle bolt system 200 and FIG. 2C illustrates a cross-section view of the toggle bolt system 200.

Toggle bolt system 200 includes a toggle 202 affixed to a strap 208 via a pin 204, creating a pivot point. Although not shown, the toggle 202 may include a threaded hole configured to accept the screw 206 or a bolt. In use, the toggle 202 may be put into a configuration such that it is parallel to the strap 208 and inserted into a hole in a wall. The toggle 202 may include a spring (not shown), as discussed above, that causes the toggle 202 to open and become perpendicular to the wall's surface. In some instances, the toggle 202 may open and become perpendicular to the inner surface of the wall by gravity, and then fully straighten out when the screw 206 is inserted and fastened down to the wall. In even another configuration, the strap 208 may be configured to be pulled to open the toggle 202. Although not shown, the strap 208 may be used to secure the cap 210 to the wall using a one-way snap similar to those seen in FIGS. 1A-B.

Once inserted into the wall, the cap 210 may be slid down the strap 208 such that at least a portion of the cap 210 is inserted into the hole in the wall, and the inner surface of the flange 216 contacts the outer surface of the wall. The toggle 202 and the flange 216 of the cap 210 may be tightened against the surfaces of the wall by inserting and screwing a screw 206 (or bolt) through the threaded hole 218 of the toggle 202. In some instances, the cap 210 may have fins, tines, or threads that prevent rotation of the cap 210 and toggle 202 when the screw 206 is tightened. Similarly, the toggle 202 may have teeth or tines that grab the wall from behind to prevent rotation when the screw 206 is tightened. The screw 206 or toggle 202 may have a thread-locking substance applied to prevent loosening of the screw 206 after initial install, particularly when the threads 214 of the cap 210 are being used.

In the illustrated FIGS. 2A, 2B, and 2C, the cap 210 may be configured with a cavity for the screw 206 to be inserted into. In some embodiments, the screw 206 may be a flathead, truss-head, or washer-head screw such that a flat surface or low-profile drive surface is created at the bottom of the cavity. The cavity may be defined by walls created in cap 210 and include threads 214 that operate as a nut and are further configured to accept a bolt. In use, a bolt (not shown) may be inserted and fastened to the threads 214 of the cap 210. When the object is to be removed, the bolt may be removed by unfastening it from the threads 214 of the cap 210. However, the other parts (toggle 202, screw 206, strap 208, and cap 210) of the toggle bolt system 200 may remain attached to the wall such that they may be reused. For example, another object may be attached to the wall via a bolt fastening to the threads 214 of the cap 210. When not in use, an end cap 212 may be inserted into the cavity of the cap 210.

The cap 210 may be made out of any number of materials, including metal (e.g., aluminum, steel, galvanized steel, stainless steel, brass, zinc, titanium, etc.), or plastic (e.g., molded nylon, polypropylene copolymer, etc.), or a combination of a plastic with a metal insert for the threaded portion. Similarly, the end cap 212 may be also be made of a material such as metal,plastic, ceramic, or wood. In some instances, the end cap 212 may be configurable with images, pictures, painted, etc.

Figure 3C:
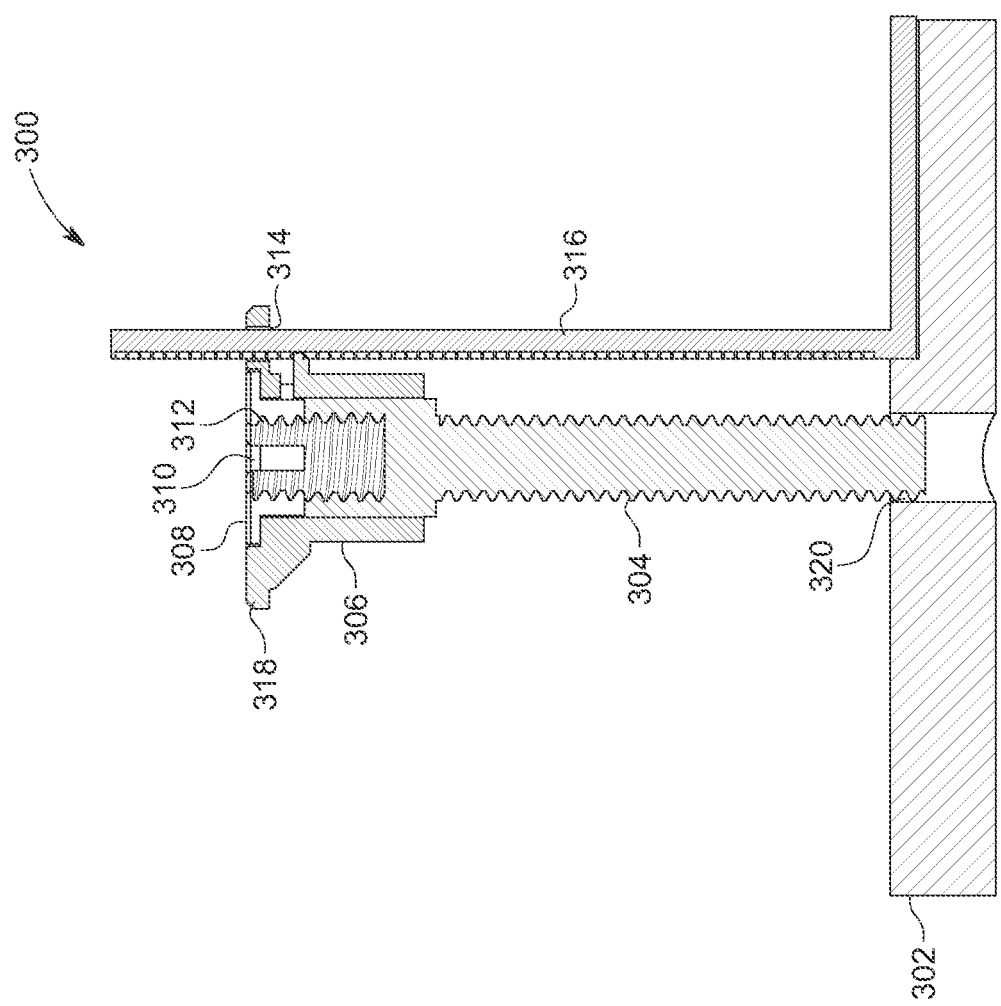

FIGS. 3A, 3B, and 3C illustrate an example embodiment of a toggle bolt system 300, including a cap 306 configured to accept a screw 304 such that when inserted, a screw head 308 of the screw 304 is flush with the outer surface of the flange 318. The screw head 308 may be configured with screw head slots 310 to accept a Flat or Phillips screwdriver or drill bit. In addition, a center portion (cavity) of the screw head 308 may include threads 312 configured to operate as a nut and accept a screw or bolt that may be used to attach, detach, and reattach objects to a wall. FIG. 3A illustrates an isometric view of the toggle bolt system 300, FIG. 3B illustrates a side view of the toggle bolt system 300, and FIG. 3C illustrates a cross-section view of the toggle bolt system 300. This implementation can also use a thread-lock substance or other adhesive/glue means to create a bond between the screw 304 and toggle 302 to prevent loosening after they are assembled, namely to prevent rotation during use of the threads 312. Similarly, the cap 306 may have fins, tines, or threads to prevent rotation of the cap 306 against the wall during install of the screw 304 or use of the threads 312 when operating as a nut.

The toggle bolt system 300 includes a toggle 302 that is affixed or attached to the strap 316. As previously discussed above, the toggle 302 may be inserted into a hole in a wall prior to the screw 304 being inserted into a threaded hole 320 of the toggle 302. The toggle 302 may be put into a configuration parallel to the strap 316 and inserted into a hole in the wall, for example. Once inserted, the strap 316 may be pulled to cause the toggle 302 to become perpendicular to the inner surface of the wall. In the illustrated example, the strap 316 may be pulled through cap slot 314 in the cap 306. A portion of the cap 306 may be inserted into the hole in the wall.

The screw 304 may be inserted through the cap 306 and screwed through a threaded hole 320 of the toggle 302 causing the cap 306 and the toggle 302 to clamp down on the wall. Specifically, a surface of the flange 318 of the cap 306 secured to the outer surface of the wall, and toggle 302 may be secured against the inner surface of the wall. In some instances, the tail or remaining portion of the strap 316 may be broken or cut off such that it does not stick out from the wall.

The screw 304 may sit in a cavity of the cap 306. The cavity may be of a depth such that the screw head 308 and the outer surface of cap 306 and flange 318 create a flat surface. As mentioned, the screw 304 may be configured with a screw head 308 having inner threads that are configured to accept another screw or bolt to secure an object to the wall. For example, a bolt may be placed through an object and coupled with the threads 312 to secure the object to the wall. In embodiments, the screw 304 may be made out of a material, such as metal, or another material, such as plastic.

As similarly discussed above for the toggle bolt system 200, the toggle bolt system 300 may be secured to the wall and may be reused a number of times to secure other objects to the wall. For example, a screw or bolt may attach to the threads 312 to affix the object to the wall. When the user is ready to take the object down, the screw or bolt may be unscrewed from the threads 312.

FIG. 4 illustrates an example of a self-drilling anchor 400, including a threaded portion (threads 408) configured to accept another bolt or screw to secure an object to a wall or surface. Thus, the cavity 406 and the thread 408 may operate as a nut for a bolt or screw to attach an object to a surface. The self-drilling anchor 400 may be a threaded anchor and can also be referred to as "self-tapping". The self-drilling anchor 400 may be made from hard nylon or metal and is able to hold heavier objects (25-75 lbs). The self-drilling anchor 400 includes a sharp, pointed shank 410 and screw threads 404 that can be screwed into the wall without a pre-drilled hole by using a screwdriver or a screw gun.

The self-drilling anchor 400 also includes a cavity 406 configured with threads 408 that may be used to fasten a bolt or screw to the self-drilling anchor 400. These threads may be lubricated or cut to be low friction (e.g., UNF) such that using a screw in the threads 408 will not rotate the portion engaged with the wall. In some instances, the cavity may be configured to accept a flat head screw that may penetrate the body of the self-drilling anchor 400, including the screw threads 404 and the shank 410. The shank 410 may be split or pre-split such that when the screw is inserted, the shank splits into two parts creating additional holding strength. In this configuration, the flat head portion of the screw may sit in the bottom of the cavity 406 such that it does not prevent another screw or bolt from being fastened to the self-drilling anchor 400 and threads 404.

In this embodiment, the self-drilling anchor 400 may also be reused. For example, an object may be fastened and unfastened to the self-drilling anchor 400 via a bolt or screw, engaging and disengaging the threads 408.

Figure 5A:
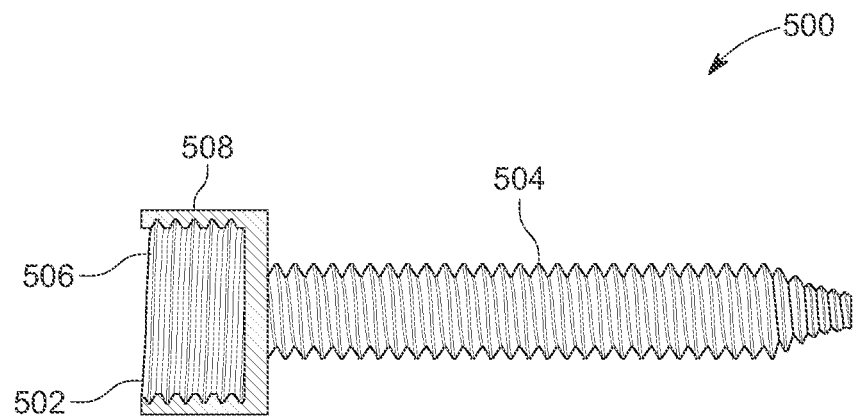
FIG. 5A illustrates an example of a wood screw according to embodiments of the present disclosure.

FIG. 5A illustrates an example of a wood screw 500 configured in accordance with embodiments discussed herein. The wood screw 500 may be used to securely attach objects to a wall where a stud is located, e.g., by being inserted directly in a stud. In embodiments, the wood screw 500 includes a head 508 having a cavity 506 and head threads 502 configured operate as a nut and to accept a bolt or a screw.

The wood screw 500 may be inserted into the wall via a screwdriver or drill. In some instances, a hole may be pre-drilled into the drywall and/or the stud prior to installing the wood screw 500. In one specific example, a hole having approximately the same size of the head 508 may be created in the drywall portion, such that the wood screw 500 may be driven into the stud and the top of the head 508 is flush with the outer surface of the wall. In another example it may have a transition portion between the screw 504 and head 508 designed to not crack drywall while drilling flush with the surface, similar to the head design commonly used on drywall screws.

As similarly discussed above, the wood screw 500 may be inserted into the wall and used/reused to attach objects to the wall.

Figure 5B:
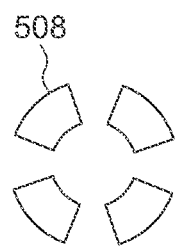
FIG. 5B illustrates an aspect of the wood screw including the head according to embodiments of the present disclosure.

FIG. 5B illustrates a top-down view of the head of the wood screw 500. The head 508 may be configured with slots to accept Phillips and/or Flat style screwdrivers or drill bits. The inner walls of the head 508 creating the cavity 506 may be configured with the threads 502 to accept the bolt or screw. In embodiments, the wood screw 500 is typically made of metal. However, embodiments may consider a wood screw 500 made of plastic.

In embodiments, the anchors discussed herein (e.g., toggle bolt system 200, toggle bolt system 300, self-drilling anchor 400, and wood screw 500) may be used in an array system to secure objects on a wall or surface. The array system may be a multiple-step system that may be outfitted on a structural surface (e.g., wall) with multiple support points to attach objects, such as modular components or products in an efficient "plug & play" type of approach. The array system removes the hassle of damaging walls each time objects need to be hung or moved on a wall within a dwelling by using the reusable anchors discussed herein.

One advantage of the array system is that that the array hardware is minimal and/or concealed, reducing visual noise and allowing a wall to be outfitted with a grid pattern, creating the functionality of a "peg board" while creating a standardized approach for partnered solutions to follow. The array system can also be a featured structural system similar to exposed brick walls in interior spaces.

Figure 1B:
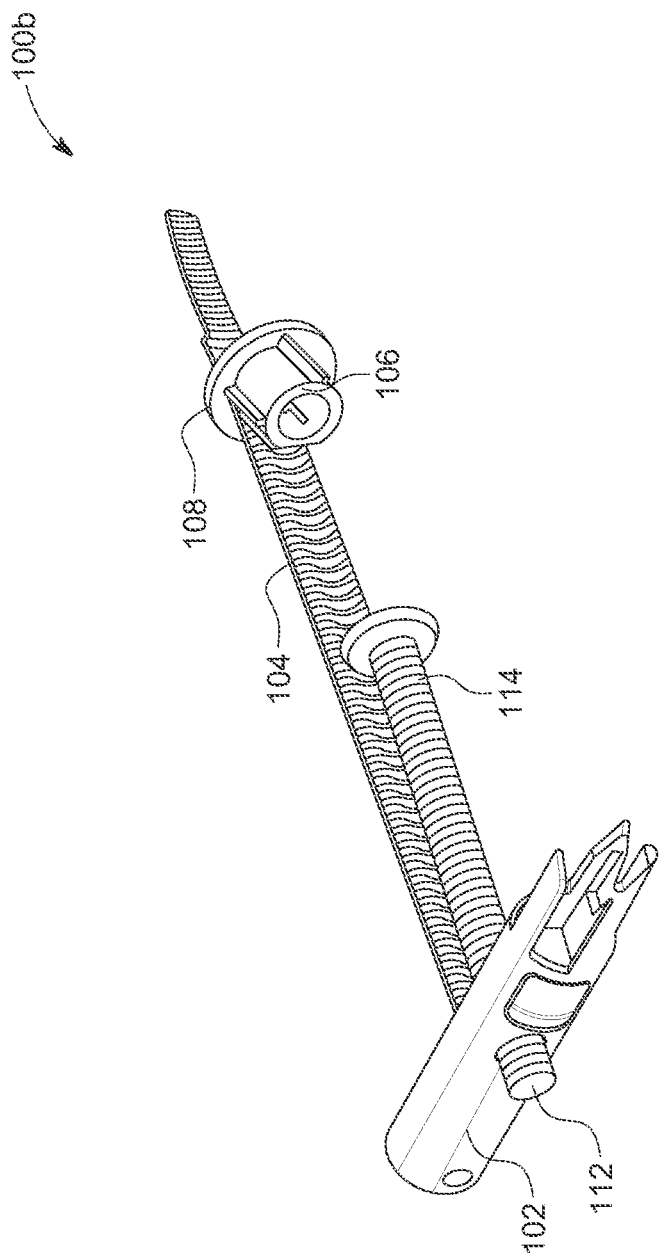
FIG. 1B illustrates another example of a prior art toggle bolt system according to embodiments of the present disclosure.

As discussed herein, another advantage is that the array hardware, such as the anchors, may be repurposed with the function to "snap in" and out modular furniture, shelves, hardware, or technology. Current wall toggle installs, as illustrated in FIG. 1A and FIG. 1B, are messy and may include a multiple-step install, which can damage walls. They are also not intended for multiple uses and are not standardized for interface with the objects that mount to them (e.g., a 30" spacing for a TV wall mount).

In an implementation, the array system or platform has a unique installation process that can leverage projection mapping or augmented reality (AR) measurement tools via a consumer tablet for quick installation aids (replaces manual construction methods like rulers and string) to reduce time, increase accuracy. In some instances, the array system enables users to create a saved grid for each install (a database with each customer) and customization and scaling of new "Array" points and pre-visualization of applications reducing common missteps and damage. However, embodiments are not limited in this manner, and in some instances, the array system may also be installed with a simple mechanical template provided with an application.

One advantage of using the projector approach to install the array system is that the array system can use three-dimensional (3D) measurements to calculate transformations for surfaces that are not flat so that a two-dimensional (2D) mounting system can be used safely and securely on a 3D wall with an amount of curvature or unevenness.

The array system may also upgrade to the common drywall sheet into a modular "peg board" to quickly outfit new spaces with the ability to hang, support, power, and move exclusive objects without drilling new holes.

Another advantage of the array system is that it allows for easier and less expensive apartment flips for tenants and property owners by reducing time spent patching, smoothing, painting, etc. Furthermore, by standardizing the mounting points for reuse, studs, bricks, concrete, or other structural surfaces are subject to fewer random drills and patches that can reduce strength in unpredictable ways. Further, the array system can be used at any phase of the construction process, such as a retrofit to upgrade an apartment wall to allow for panel mounting of accent walls by the tenant or the construction crew. And it can be saved into building schematics for future reference in retrofit planning and maintenance.

FIG. 6A illustrates an example of an array system configuration 600 that may be applied to a wall or surface. In the illustrated example, the representative wall 602 may include sheets of drywall, but embodiments are not limited in this manner. The array system configuration 600 may be configured for any size and configuration of a wall, including walls that have curved surfaces, as previously mentioned. The anchors 604 may be presented by each of the circles on the wall and may be evenly spaced across the wall 602. For example, each of the anchors 604 may be spaced evenly between each of the studs holding up the wall, e.g., every 16 or 24 inches based on the standard spacing for studs. However, embodiments are not limited in this manner, and the space/placement of each of the anchors 604 may be based on other standards, such as a VESA hole pattern for TV mounts. In addition, the array system configuration 600 may be based on an application for use, e.g., supporting furniture, electronic equipment (TV), shelving, lighting, and so forth. FIG. 6A indicates a number of heights that work well for different types of uses for the array system configuration 600, including 30 inches for a desk/table shelf, 50 inches for a tv or monitor shelf, 70 inches for tv, art, clothes hanger, and 90 inches for high storage shelf or lighting. Embodiments are not limited to these examples.

In some instances, the array system configuration 600 may be installed on a wall 602 using a projector or projection device to ensure the anchors 604 are installed correctly, e.g., in accordance with a grid pattern. FIG. 6B illustrates one possible example of a projector 606 projecting an image on a wall 602, including indicators 608 for placement of the anchors 604. As illustrated, the projector 606 may be configured to project the indicators 608 in a grid pattern. The pattern may be configured and based on the size of the wall. In some embodiments, may not be a grid pattern. For example, the projector 606 may be configured with software to enable a user to a pattern to present on the wall 602. The user may utilize a computing device to select a location for each anchor to be installed. A configuration file, such as a text file, comma-separated values (cvs) file, etc., may be provided to the projector 606, and the projector 606 may be configured to present the pattern based on the file. In embodiments, the projector 606 may be configured with memory to store any number of pattern configurations such that a user may go back and replicate an installation pattern for the anchors.

In some embodiments, the array system configuration 600 may be configured using a mobile app and/or website to arrange furniture, electronic equipment (TV), shelving, lighting, etc., desired for the wall 602. The app/website may allow a user (e.g., apartment resident) to order furniture that can be mounted on the wall 602, and also allow access to be programmatically provided to an installer or other person, which allows the furniture to be installed on the wall 602 before the resident moves in. In some embodiments, the user may be provided with a predetermined list of vendors selling items appropriate for installation within the array system configuration 600. For example, once a particular item is virtually placed along the wall 602 by the user, a list of links to various vendors or retailers may be presented to the user automatically or in response to a user input (e.g., user clicks on the virtual item or hovers pointer over the virtual item). The user may then complete the transaction with the retailer, if desired.

As part of the transaction process, the app/website may provide the retailer with an access code to complete delivery and/or installation at a scheduled date and time in the future. For example, in the case the wall 602 is located within a building (e.g., apartment) outfitted with an access control system, a temporary access code may be generated and provided to the installer for access.

Figure 7A:
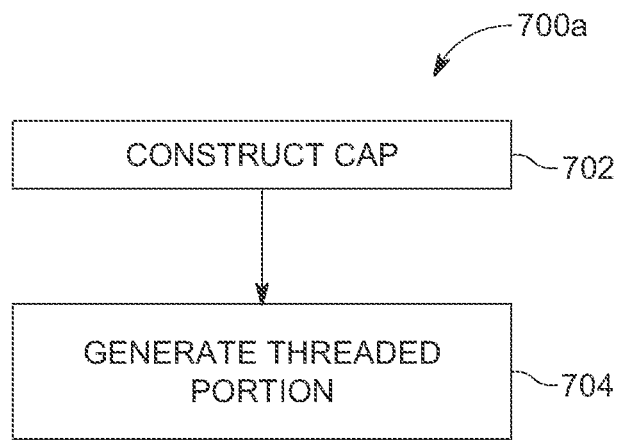
FIG. 7A illustrates an example of a flow diagram to produce a cap of a toggle bolt system according to embodiments of the present disclosure.

FIG. 7A illustrates an example of a flow diagram 700a to produce a cap for a toggle bolt system, such as cap 210 of toggle bolt system 200. Note that the flow diagram 700a is directed to producing the cap with the threaded portion; however, the toggle bolt system 200 includes additional components that may be manufactured using similar techniques.

In embodiments, the processing flow 700a includes constructing the cap portion of the toggle bolt system at block 702. For example, the cap 210 of toggle bolt system 200 may be formed or produced by lathe machining, die casting, or hot forging. In another example, the cap 210 may be formed or produced by three-dimensional (3D) printing with a 3D printer or sintering. As previously mentioned, the cap 210 may be made of plastic, metal, or combination thereof.

At block 704, the processing flow 700a includes generating the thread portion of the cap. For example, the threads 214 may be directly tapped into the cap 210 by screw machining. In other instances, the threads 214 may be formed during the construction of the cap 210 itself. For example, the threads 214 may be constructed during an injection molding process over a threaded insert that may be made of a material such as metal or ceramic. In some embodiments, processing techniques may include heat pressing, ultrasonically pressing, and/or pressing a metal/ceramic insert into a molded cap 210. In some embodiments, the threads 214 may be formed during the 3D printing process or during the sintering process.

In embodiments, the threads 214 may be conventional threads in accordance with one or more standards, such as American Pipe Threads, Society of Automotive Engineers (SAE) threads, Unified Threads (UN/UNF), British Standard Pipe (BSP) Threads, Metric Threads (parallel or tapered), and so forth. In some embodiments, the threads 214 may be quick release or quarter turn interlocking threads. Embodiments are not limited to these examples.

Figure 7B:
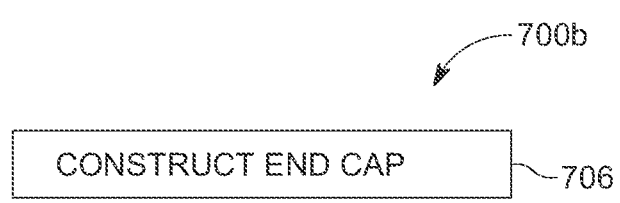
FIG. 7B illustrates an example of a flow diagram to produce an end cap of a toggle bolt system according to embodiments of the present disclosure.

FIG. 7B illustrates an example of a flow diagram 700b to produce an end cap, such as end caps 212. At block 706, the end cap may be constructed. In embodiments, the end cap 212 may be made in accordance with the following processes injection molding, die casting, hot or cold forging, turning on a lathe, or milling.

Figure 8A:
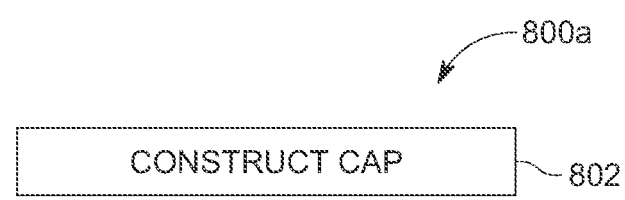
FIG. 8A illustrates an example of flow diagram to produce a cap including threads of a toggle bolt system according to embodiments of the present disclosure.

FIG. 8A illustrates an example of flow diagram 800a to produce a cap for a bolt/screw having a threaded portion, such as cap 306 illustrated in FIGS. 3A-3C. In embodiments, the processing flow 800a includes constructing the cap portion at block 802. The cap 306 may be made by performing a process such as injection molding, die casting, turning on a lathe, or milling.

Figure 8B:
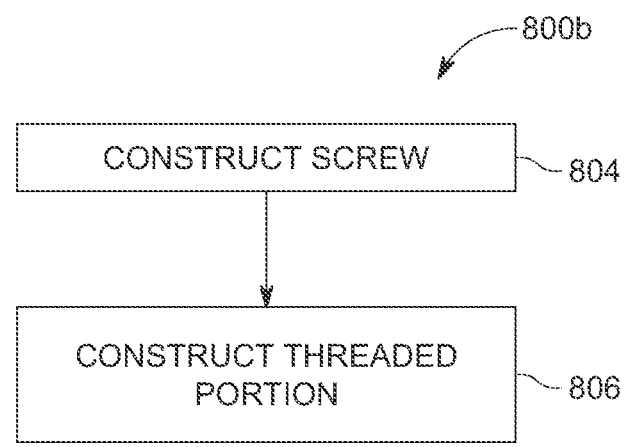
FIG. 8B illustrates an aspect of the subject matter according to embodiments of the present disclosure.

FIG. 8B illustrates an example of an item 800b to produce a bolt or screw having a threaded portion, such as screw 304 and screw head 308 having threads 312. At block 804, the screw may be constructed. Constructing or producing the screw may be made by lathing or die casting, forging in bar stock, 3D printing, sintering, and so forth. At block 806, the threads 312 may be created. In one example, the threads may be created by direct thread cutting, screw machining or secondary thread cutting. In another example, a nut portion of screw head 308 may be machined then welded onto a stem portion of the screw 304. The threads may be conventional or quarter turn threads. Embodiments are not limited in this manner.

Figure 9:
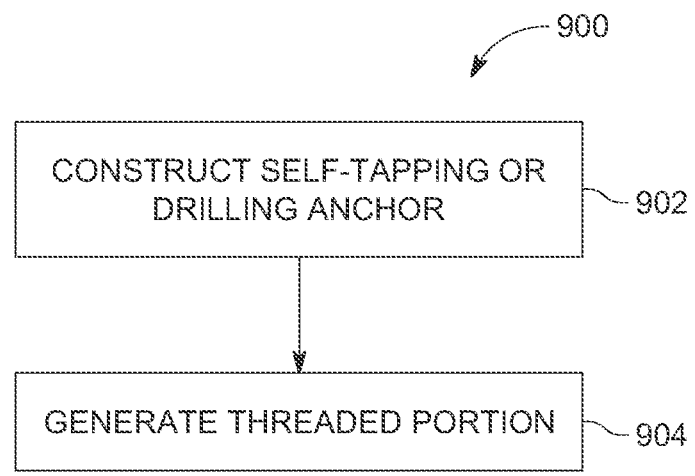
FIG. 9 illustrates an example of a flow diagram to produce a self-drilling anchor with threads according to embodiments of the present disclosure.

FIG. 9 illustrates an example of a flow diagram 900 to produce self-drilling anchor 400 with threads 408. At block 902, the processing flow 900 includes generating a shelf-drilling or tapping anchor, and at block 904, the thread portion may be created. In some instances, the anchor and the threaded portion may be made during a single step. For example, the self-drilling anchor 400 may be produced by injection molding over a prefabricated metal nut. In other example, the threads 408 may be created by heat staking or ultrasonic pressing of a metal insert into a molded or printed plastic or metal anchor. In a third example, the body of the self-drilling anchor 400 may be die casted and the threads 408 may be tapped into the self-drilling anchor 400. In a fourth example, the self-drilling anchor 400 may be 3D printed or sintered, and the threads may be printed or cut with a thread cutter. As similarly discussed above, the threads may be conventional threads or quarter-turn threads.

Figure 10:
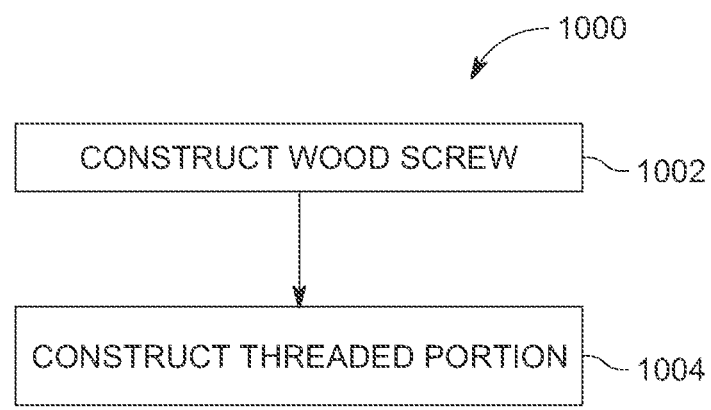
FIG. 10 illustrates an example of flow diagram to produce a wood screw with threads according to embodiments of the present disclosure.

FIG. 10 illustrates an example flow diagram 1000 to produce a wood screw 500 with threads 502. At block 1002, the screw may be constructed or formed and, at block 1004, the threaded portion may be constructed or formed. As similarly discussed above, the screw with threads on the head may be formed as part of a single process or more than one step may be performed. For example, the screw may be forged from bar stock followed by screw machining of the thread features, e.g., threads 502. In another example, the body of the screw (shank 504) may be forged, and a prefabricated nut may be welded on to the shank 504. In a third example, the wood screw 500 may be 3D printed or sintered and threads may be cut into the printed portion. As similarly discussed above, the threads may be conventional threads or quarter-turn threads.

FIGS. 11A-11B illustrate an example system/assembly 1100 according to embodiments of the present disclosure. As shown, the assembly 1100 may include a wall plate 1102 operable to be secured to a structure (not shown), such as a wall, ceiling, door, etc., by a plurality of fasteners 1109 (e.g., screws). In various embodiments, the fasteners 1109 may include any of the toggle bolt systems described herein. The fasteners 1109 may be evenly spaced across the wall plate 1102. For example, each of the fasteners 1109 may be spaced evenly between studs holding up a wall, e.g., every 16 or 24 inches based on the standard spacing for studs. However, embodiments are not limited in this manner. Coupled to the wall plate 1102 may be a faceplate 1104. Although non-limiting, the faceplate 1104 may cover the wall plate 1102 such that generally only the faceplate 1104 is visible when viewing the assembly 1100 head-on. The assembly 1100 may include a first end 1106 opposite a second end 1108, and a top side 1110 opposite a bottom side 1112. As will be described in greater detail below, the assembly 1100 may include one or more mounting clips 1107 coupleable with the faceplate 1104 and/or the wall plate 1102.

The wall plate 1102 and the faceplate 1104 may be made out of any number of materials, including metal (e.g., aluminum, steel, galvanized steel, stainless steel, brass, zinc, titanium, etc.), or plastic (e.g., molded nylon, polypropylene copolymer, etc.), or a combination of a plastic and metal. In some instances, the faceplate 1104 may be configurable with images, pictures, painted, etc.

Figure 12A:
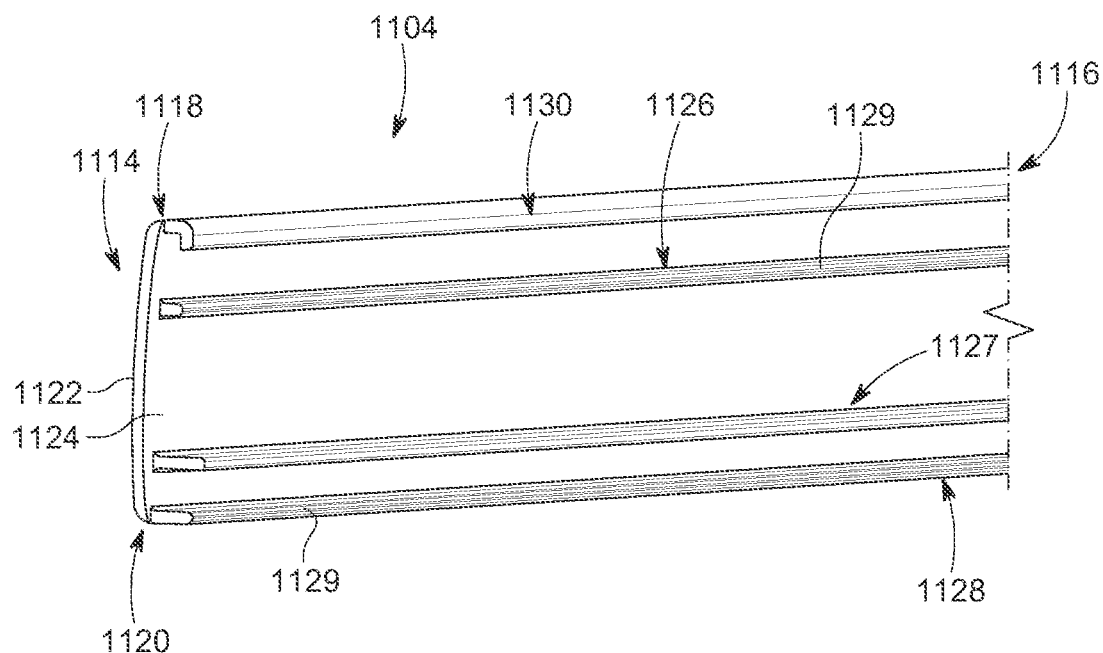
FIGS. 12A-12B demonstrate a faceplate of the assembly according to embodiments of the present disclosure.
Figure 12B:
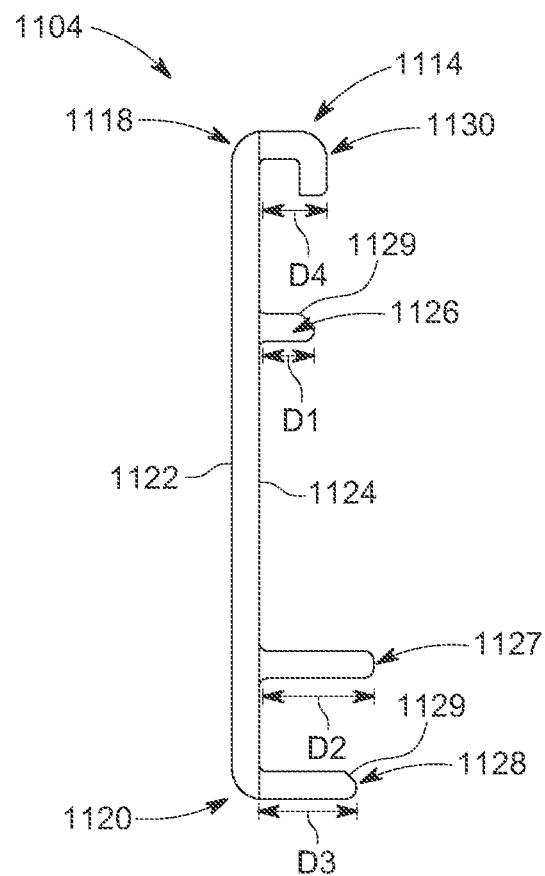

FIGS. 12A-12B demonstrate the faceplate 1104 in greater detail. As shown, the faceplate 1104 may include a first end 1114 opposite a second end 1116, and an upper end 1118 opposite a lower end 1120. The faceplate 1104 may include an outer side 1122 opposite an inner side 1124. As shown, the outer side 1122 and the inner side 1124 extend substantially parallel to one another. Extending from the inner side 1124 may be a plurality of protrusions or ridges, such as a first ridge 1126, a second ridge 1127, and a third ridge 1128. In some embodiments, the first and third ridges 1126, 1128 may each include a sloped or beveled edge 1129 at a free end thereof. For example, the beveled edge 1129 of the first ridge 1126 may provide better engagement with the wall plate 1102 when the faceplate 1104 and the wall plate 1102 engage one another.

In some embodiments, the first ridge 1126 may extend away from the inner side 1124 by a first distance or dimension 'D1', the second ridge 1127 may extend away from the inner side 1124 by a second distance 'D2', and the third ridge 1128 may extend away from the inner side 1124 by a third distance 'D3'. As shown, D2 is greater than D3, which is greater than D1. The first ridge 1126 and the second ridge 1127 may engage an interior of the wall plate 1102, as will be described in greater detail below. It will be appreciated that the various dimensions of the plurality of ridges may vary.

As further shown, the faceplate 1104 may include an upper lip 1130 operable to extend over the wall plate 1102, to support the faceplate 1104 when the faceplate 1104 and the wall plate 1102 are joined together. Although non-limiting, the upper lip 1130 may extend away from the inner side 1124 by a fourth distance 'D4'.

Figure 13A:
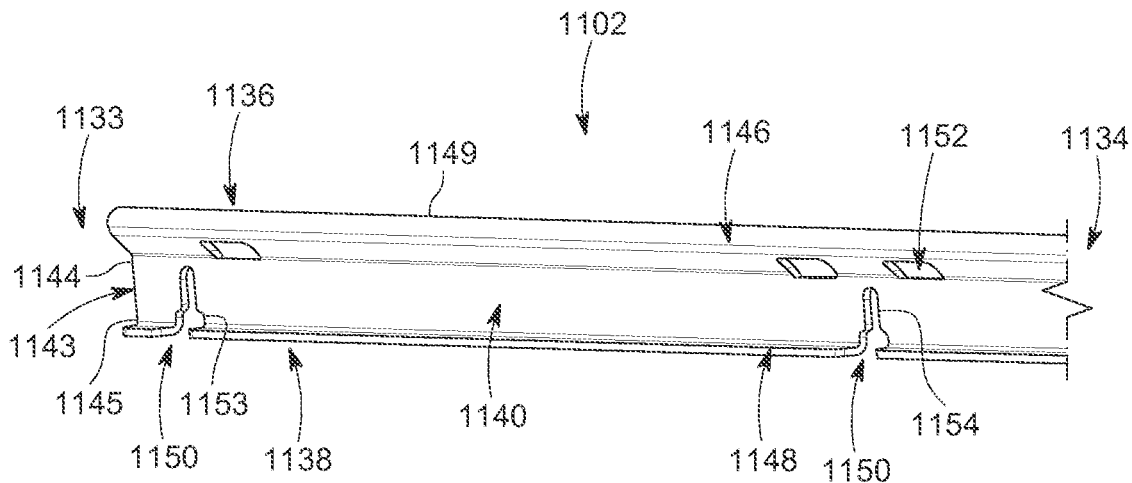
FIGS. 13A-13B demonstrate a wall plate of the assembly according to embodiments of the present disclosure.
Figure 13B:
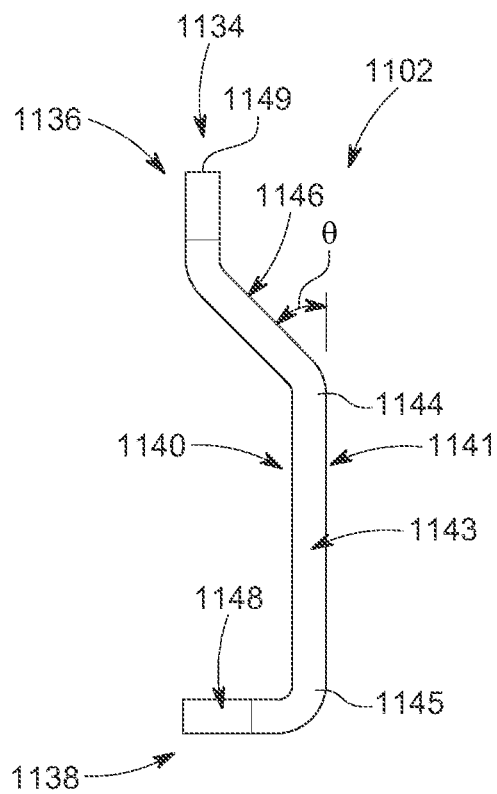

FIGS. 13A-13B demonstrate the wall plate 1102 in greater detail. As shown, the wall plate 1102 may include a first end 1133 opposite a second end 1134, and an upper end 1136 opposite a lower end 1138. The wall plate 1102 may include an inner side 1140 opposite an outer side 1141, wherein the inner side 1140 faces the faceplate 1104 and the outer side 1141 faces a wall or other structure the wall plate 1102 is being secured to.

In exemplary embodiments, the wall plate 1102 may include a first section 1143 extending substantially parallel to a plane defined by the structure, the first section 1143 including a first end 1144 and a second end 1145. A second section 1146 of the wall plate 1102 may extend from the first end 1144, while a third section 1148 of the wall plate 1102 may extend from the second end 1145. As shown, the second section 1146 may initially extend away from the first section 1143 at a non-zero angle θ, and may include a free end 1149 extending substantially parallel to the first section 1143. The third section 1148 of the wall plate 1102 may be oriented perpendicular to the first section 1143. However, embodiments herein are not limited in this context. Furthermore, in some embodiments, no third section is present. Instead, the wall plate 1102 may be securing the faceplate 1104 against vertical motion, as the faceplate 1104 grabs the bottom edge of the first section 1143 of the wall plate 1102.

As further shown, the wall plate 1102 may include a plurality of fastener openings 1150 extending through at least one of the first section 1143 and the third section 1148. Fasteners 1109 (FIG. 11B) are operable to extend through the fastener openings 1150 to secure the wall plate 1102 to the structure. Each of the fastener openings 1150 may include a base opening 1153 connected with a neck opening 1154. During assembly, the fasteners 1109 are initially inserted through the base opening 1153 where the head of the fastener fits through the base opening, and the wall plate 1102 is lowered along the wall until the shank, shoulder, or threaded portion of the fasteners enter the neck openings 1154.

The wall plate 1102 may further include a plurality of clip openings 1152 extending through at least one of the first section 1143 and the second section 1146, the clip openings 1152 operable to receive one or more mounting clips, which may be used to support furniture, electronic equipment (TV), shelving, lighting, and so forth. Although non-limiting, a pair of clip openings 1152 may be provided on opposite sides of the fastener openings 1150.

Figure 14:
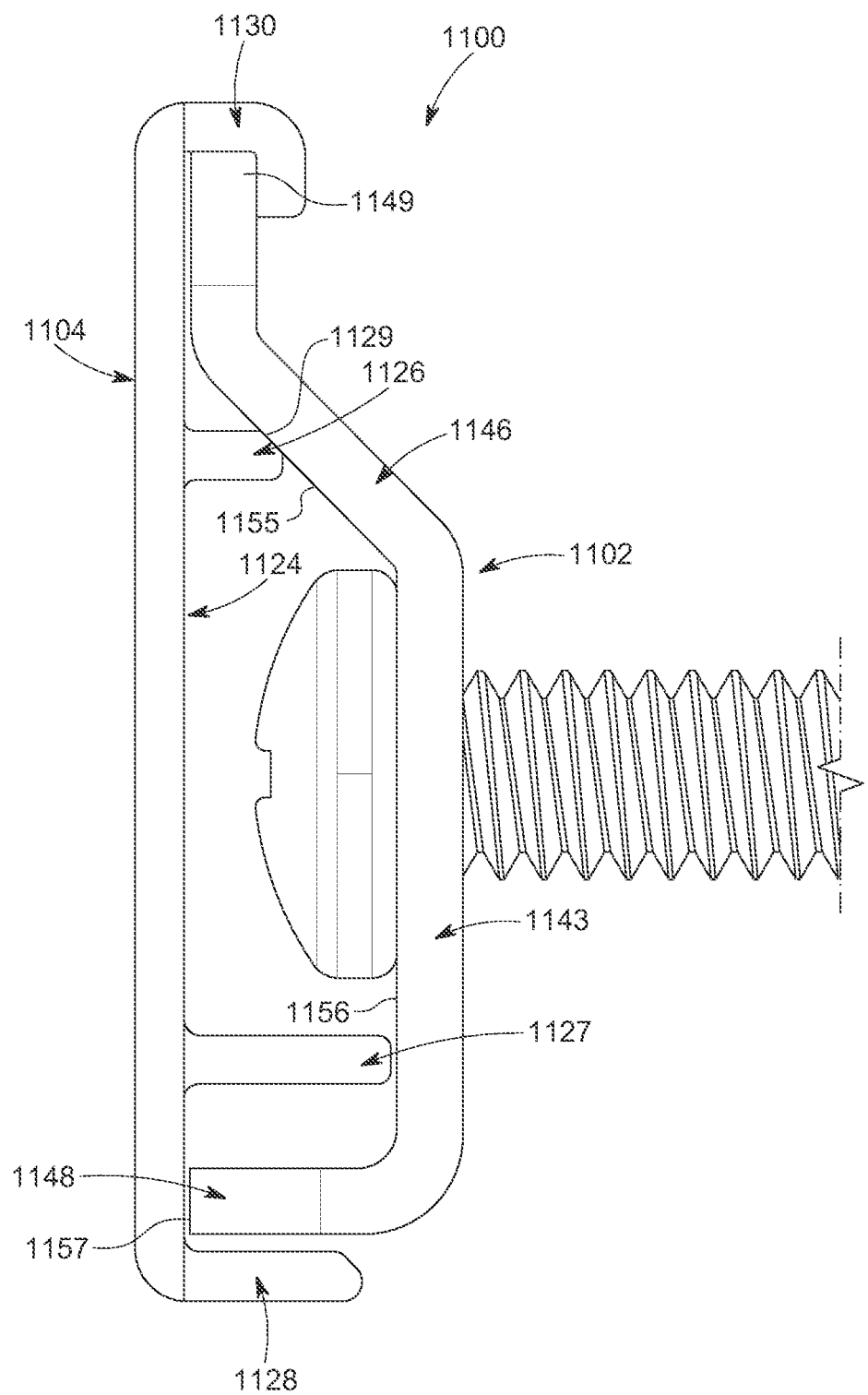
FIG. 14 demonstrates connection between the wall plate and the faceplate according to embodiments of the present disclosure.

FIG. 14 demonstrates connection between the wall plate 1102 and the faceplate 1104 of the assembly 1100 in greater detail. As shown, the first ridge 1126, the second ridge 1127, and the third ridge 1128 of the faceplate 1104 extend towards the wall plate 1102 from the inner side 1124 thereof. The first ridge 1126 may be in abutment with an inner surface 1155 of the second section 1146, and the second ridge 1127 may be in abutment with an inner surface 1156 of the first section 1143. The beveled edge 1129 of the first ridge 1126 may provide increased engagement between the first ridge 1126 and the inner surface 1156. As shown, the second ridge 1127 extends farther from the inner side 1124 than the first ridge 1126 to complement the shape of the first and second sections 1143, 1146 of the wall plate 1102. In some embodiments, the third ridge 1128 may extend beneath the third the section 1148 of the wall plate 1102 to limit vertical movement of the faceplate 1104 and the wall plate 1102 relative to one another. Said another way, the third section 1148 may be interposed between the second and third ridges 1127, 1128. In some embodiments, an end face 1157 of the third section 1148 may abut the inner side 1124 of the faceplate 1104. As shown, the third ridge 1128 has a beveled edge which provides clearance for assembly, whereby the two parts interface at the free end 1149 of the wall plate 1102, and the bottom of the faceplate 1128 is rotated towards the support structure resulting in the configuration show in FIG. 14. Said another way, the free end 1149 of the wall plate 1102 may be inserted at an angle into the cavity defined by the upper lip 1130 of the faceplate 1104, and then the lower end 1120 of the faceplate 1104 and the lower end 1138 of the wall plate 1102 may be brought together. The upper lip 1130 of the faceplate 1104 wraps or extends over the free end 1149 of the third section 1148 of the wall plate 1102 to support the faceplate 1104 and prevent the faceplate 1104 from becoming easily disengaged from the wall plate 1102.

Figure 15A:
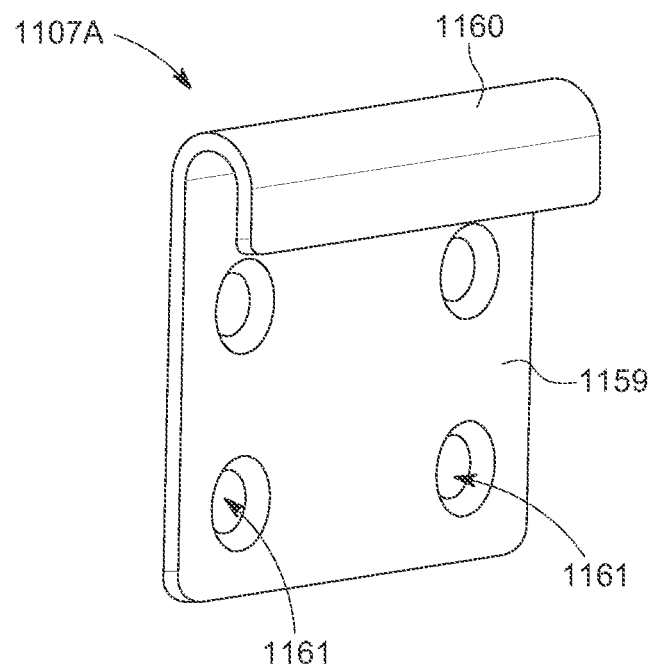
FIG. 15A demonstrates an example mounting clip according to one embodiment of the present disclosure.

FIG. 15A demonstrates an example mounting clip 1107A according to one embodiment. As shown, the mounting clip 1107A may include a main section 1159 positionable adjacent the outer side 1122 of the faceplate 1104, and an overlap section 1160 extending from the main section 1159. The overlap section 1160 is operable to extend over the upper end 1118 of the faceplate 1104. The mounting clip 1107 may further include a plurality of openings 1161 through the main section 1159, wherein the plurality of openings 1161 are each operable to receive a fastener (not shown) therein. In various embodiments, the fasteners and the mounting clip 1107A may secure an item (e.g., furniture, shelving, electronics, etc.) to the faceplate 1104.

Figure 15B:
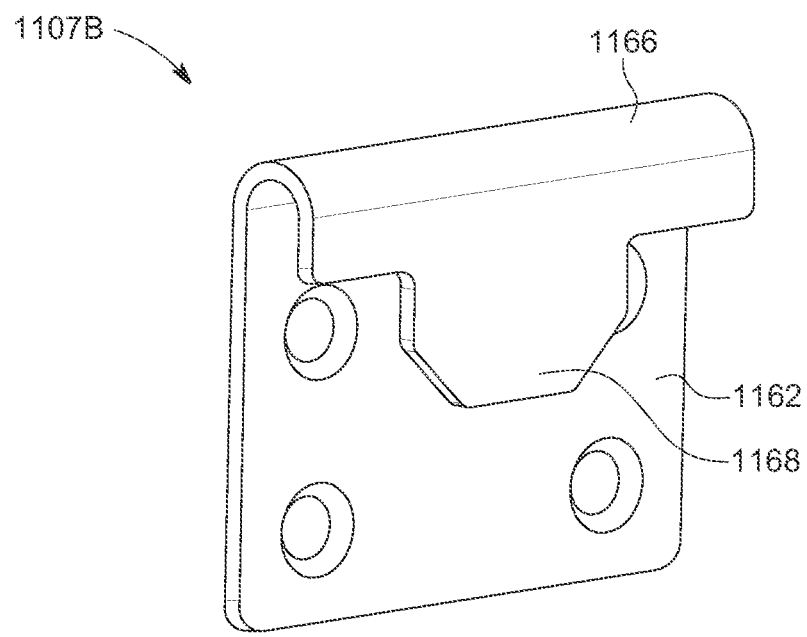
FIG. 15B demonstrates another example mounting clip according to one embodiment of the present disclosure.
Figure 16:
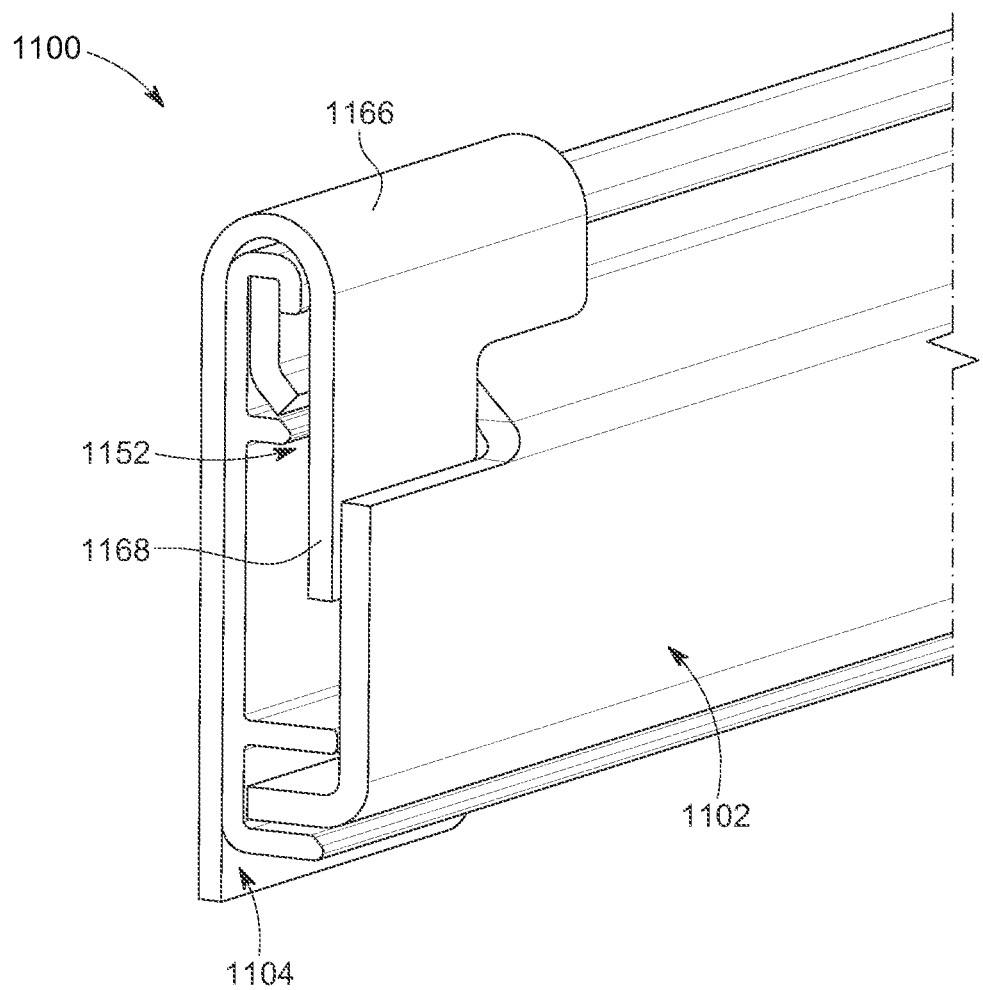
FIG. 16 demonstrates use of the mounting clip of FIG. 15B according to embodiments of the present disclosure.

FIG. 15B demonstrate another example mounting clip 1107B. As shown, the mounting clip 1107B may include a main section 1162 positionable adjacent the outer side 1122 of the faceplate 1104, and an overlap section 1166 extending from the main section 1162. The overlap section 1166 may include a tab 1168 in a central section thereof. As demonstrated in FIG. 16, the tab 1168 of the overlap section 1166 may extend through the clip opening 1152 of the wall plate 1102. The overlap section 1166 may therefore be engaged with both the wall plate 1102 and the faceplate 1104.

As described above, the array system configuration 600 (shown in FIGS. 6A-6B) may be configured using a mobile app and/or website, wherein the app/website may provide the retailer with an access code to complete delivery and/or installation. It will be appreciated that the app/website may operate with, or be part of, an access control system (hereinafter "system"). According to embodiments, the system can include a smart access control reader (hereinafter referred to as the "smart reader"), which is a hardware device that can provide access to physical space. The disclosed smart reader can replace existing access control readers, for example, prior art access control readers, in an existing access control system. The disclosed system can also include a suite of software that can control the smart reader. The software can be installed and/or executed on one or more of the following devices: the smart reader, a user device that is used to communicate with the smart reader, and any other devices that are used to manage the access control system. For example, these devices can include user devices of residents and guests of a building that has implemented an access control system utilizing the smart reader, to provide controlled access to residents of the building and their guests. The smart reader can include secure wireless communication components that can be used in conjunction with user authentication mechanisms, e.g., mechanisms involving access cards, passwords, visual identifiers, biometric identifiers, and smartphones to provide access control. Such authentication mechanisms can be implemented as a part of the smart reader and/or as a part of a user device. They can also be implemented as a separate, standalone device(s) that is connected to the smart reader. The smart reader can be paired with any number of different trim pieces, including locks, doors, electric access control systems, storage containers, vehicles, and any other device needing to be secured.

The smart reader can be valuable within many industries, including the commercial office and multi-unit building industry, because it can replace an existing access control reader, e.g., an access control reader using a conventional proximity or magnetic stripe card system, without the need to rewire the underlying building infrastructure. As replacing equipment or adding new equipment is a costly part of maintaining or installing an access control system, means of upgrading existing equipment with minimal installation time and effort can be substantially valuable, and the smart reader can provide these means.

Unlike traditional security hardware products that were built to accomplish specific goals in specific instances, the disclosed smart reader can regulate access to any other device, to which the smart reader can be attached or connected. In some embodiments, the smart reader can be physically attached or connected to another device. For example, the smart reader can attach or connect to another device using a wire. As another example, the smart reader can attach or connect to another device wirelessly.

The smart reader has many advantages over traditional reader products as the smart reader can enable simplified engineering and simplified manufacturing. The disclosed smart reader can use similar device firmware across multiple products, can provide a uniform user experience across multiple contexts and environments, can manage an entire network of access points in a similar way, can allow the development of a unified set of software applications running on electronic devices that can interact with any access point, can provision a single credential to operate in multiple contexts, can create a single secure identity that can be utilized at multiple access points, can layer various multifactor or 3-factor authentication mechanisms into each access point where the smart reader is installed, can more easily replace faulty components in the field, can provide inventory flexibility when considering the manufacturing, fulfillment, and installation of components in the field and can provide numerous other logistical advantages known to those familiar with the industry and its challenges. In addition, the smart reader can make retrofitting into existing buildings easy and can enable nearly instantaneous access and user management. The smart reader can also provide new levels of visibility into available access and history.

According to embodiments of the present disclosure, the smart reader can detect a building's preexisting credentialing system and adapt the building's preexisting communications to mimic the operations of the access control reader it is replacing. By mimicking the former access control reader's communications, the smart reader can gain control over the entire access control system at the building. Using internal components, such as a microprocessor, internal storage, and wireless communications equipment, the smart reader can process, store, and manage credentials for users at the building without having to use the previous system.

In addition, the smart reader can be installed in new building environments and utilize more advanced wired communications, e.g., power over Ethernet, or wireless communications to perform the same functions without the need to utilize a separate access control panel and credential management system.

In some embodiments, the access control reader can receive and process credentials, e.g., signals that can identify different individuals. The access control reader can use one or more of different mechanisms, including a magnetic stripe reader system, a proximate reader system, a radio-frequency identification (RFID) system, a key code entry system, and a biometric system, e.g., biometrics involving a fingerprint, retina, and palm, to receive the credentials. Depending on the mechanism, the required user input to gain access to a secure space can be different. For example, a magnetic card reader can require a user to swipe a card that includes a magnetic stripe on the card. As another example, a proximity card reader can require a user to place a proximity card close to the access control reader. Yet in another example, a key code entry system can require a user to enter in an access code. After the access control reader receives the user input, the access control reader 102 can then process the received user input, e.g., a user credential, by determining the corresponding identity. The access control reader can determine the corresponding identity, for example, by examining the user credential to check whether it is valid. In some embodiments, if the user credential is valid, the access control reader can send a signal to the access control panel, where the signal is known to the access control panel to unlock the electronic locking mechanism. In some embodiments, the access control reader can translate the received credentials, for example, into a predetermined alpha-numeric format, which can then be transmitted to the access control panel using a wire.

In some embodiments, the access control panel can store a preset list of authorized credentials and process received signals based on this preset list. The access control panel can receive the translated credential from the access control reader. The access control panel can then check this translated credential against the preset list to determine whether the user is authorized to perform the desired action at the desired time. For example, the user may be attempting to access a secure area at 10 PM on Wednesday using the user's card but the user may be allowed to access the secure area only between 9 AM and 5 PM on weekdays. In this example, the access control panel can deny the user access because the access control panel has determined that the user is trying to access the secure area outside the allowed time. However, had the user been attempting to access the secure area during the allowed time, e.g., at 3 PM on Wednesday, the access control panel could have allowed the user to access the secure area.

The access control panel can allow access to the user by transmitting signals to the electronic locking mechanism using the wire such that the electronic locking mechanism can unlock the locking mechanism. The user can access the secure space when the locking mechanism has been unlocked. For example, the electronic locking mechanism can unlock a lock for a door, a locker, or any other locked secure space. The electronic locking mechanism can lock the secure space again after one or more of the following conditions have been satisfied: the user has entered the secure area, the user has entered the secure area and left the secure area, a pre-defined period of time has passed since the lock was unlocked, or any other conditions that the access control system administrator has defined. In some cases, only one of the conditions can be required; in other cases, more than one conditions can be required. Various components that are part of the smart reader can be implemented as hardware, software, or combinations of both. These various components can be arranged in different ways.

Figure 17:
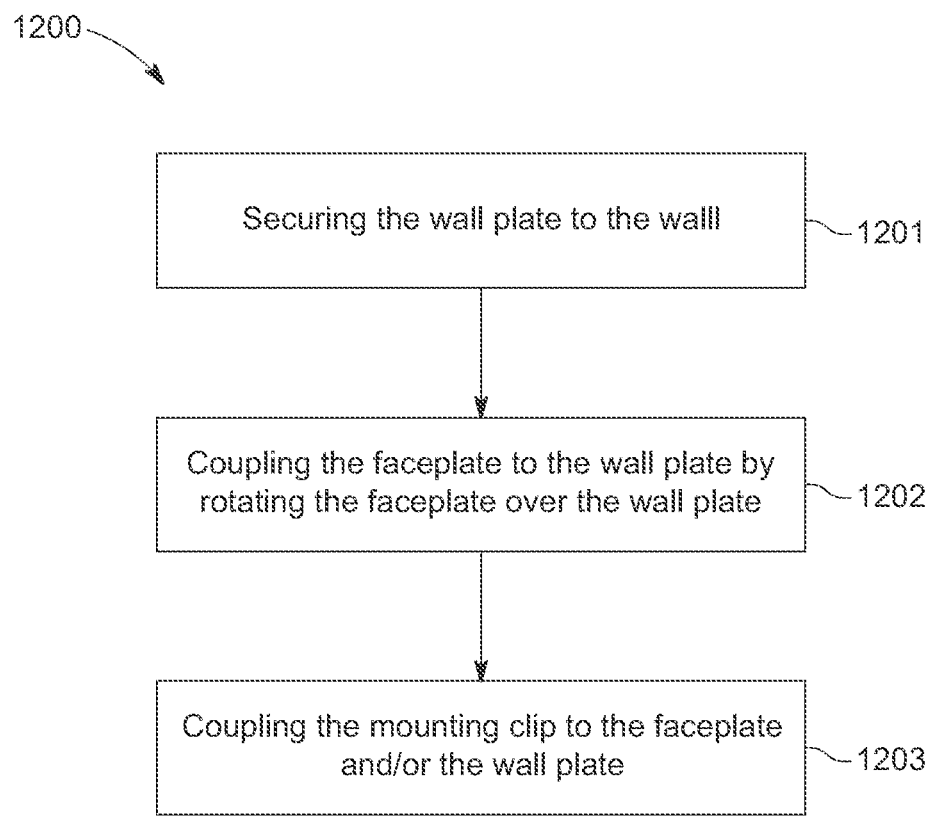
FIG. 17 demonstrates a method for assembling the assembly according to embodiments of the present disclosure.
Figure 18A:
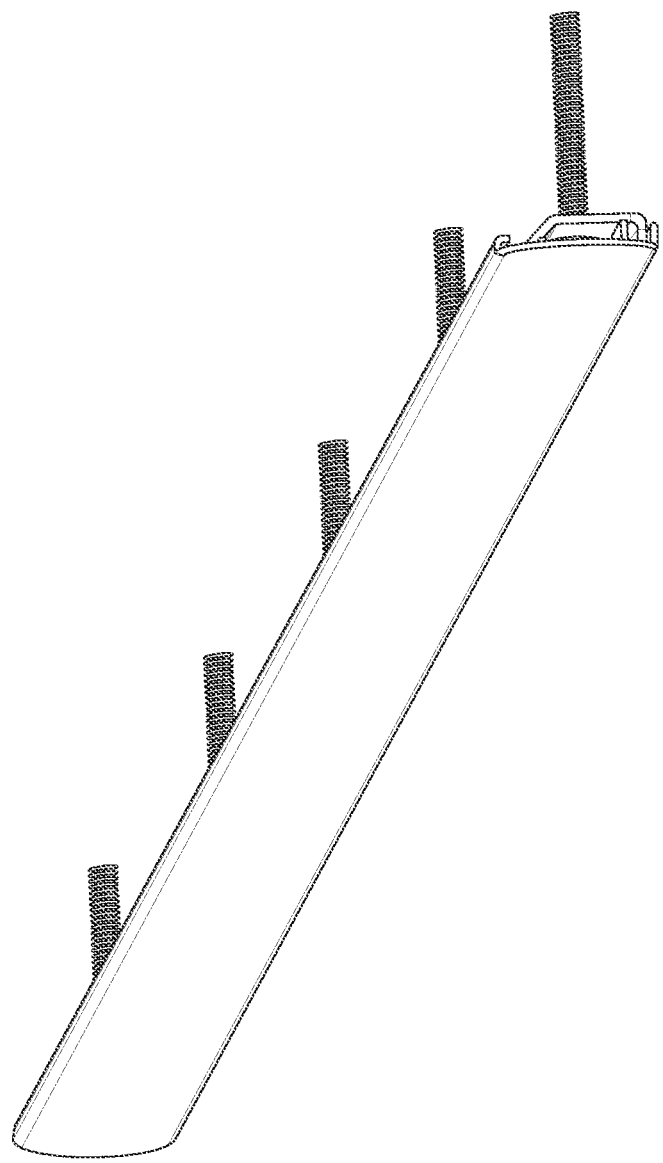
FIGS. 18A-18G demonstrate various views of the assembly according to embodiments of the present disclosure.
Figure 18B:
Figure 18C:
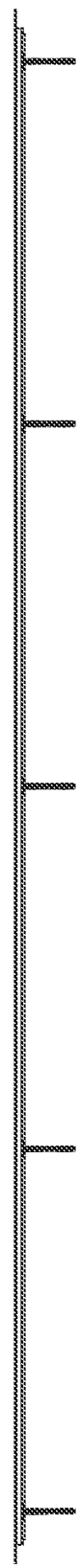
Figure 18D:
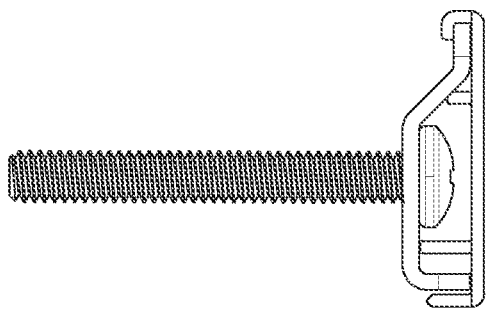
Figure 18E:
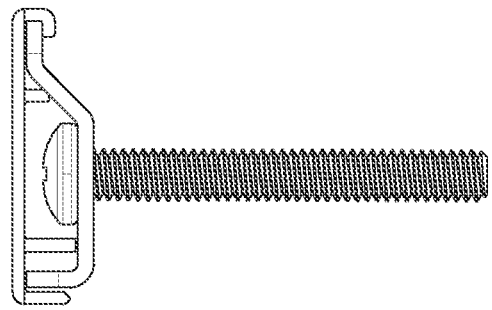
Figure 18F:
Figure 18G:
Figure 19A:
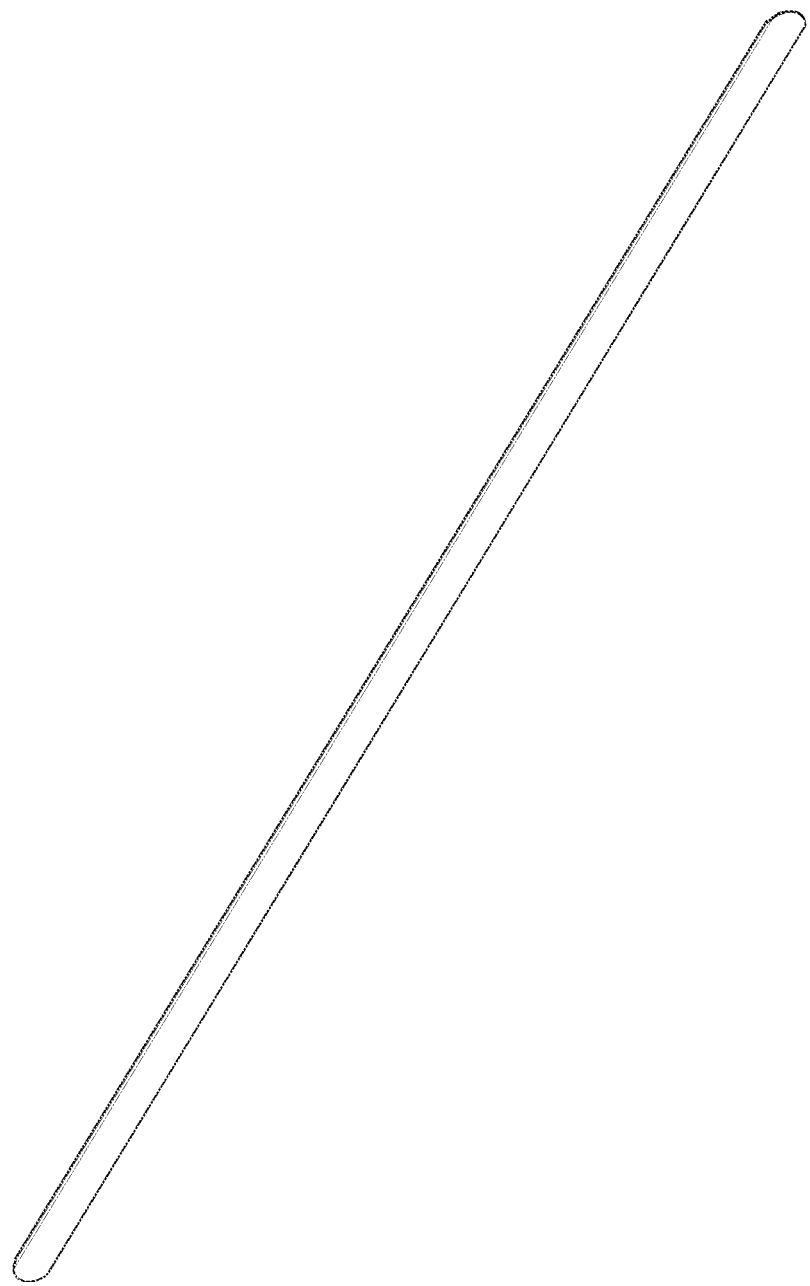
Figure 19D:
Figure 19E:
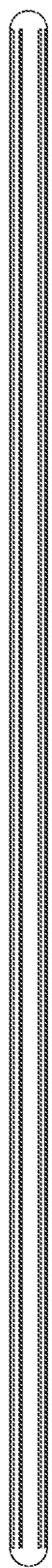
Figure 19F:
Figure 19G:
Figure 20A:
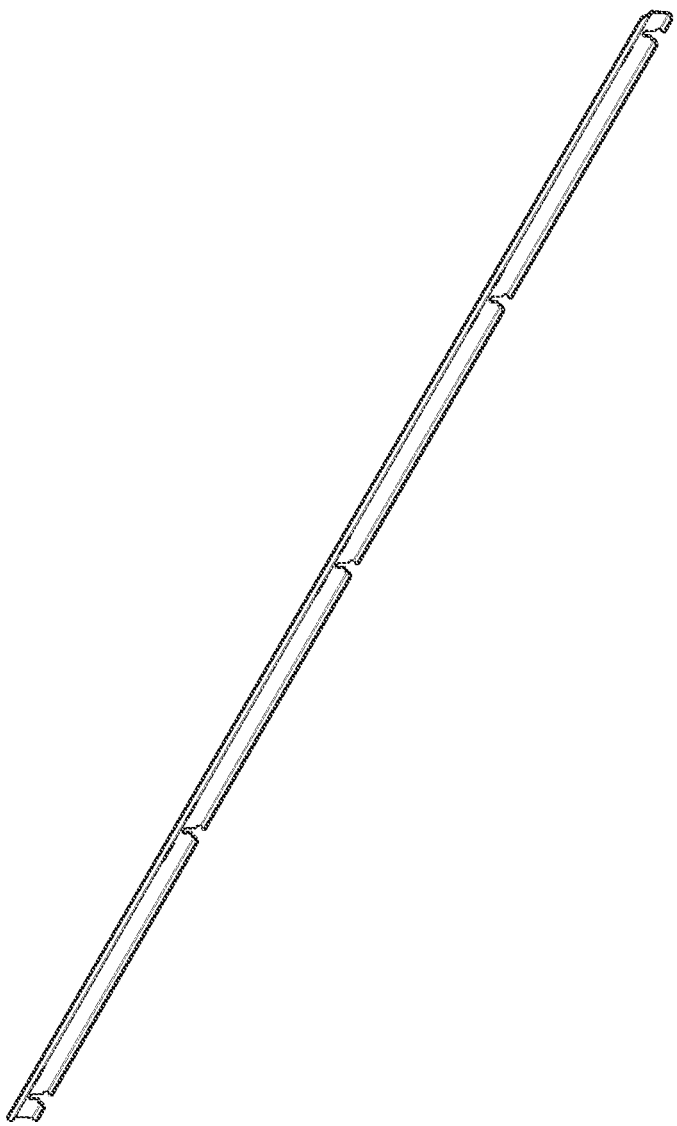
FIGS. 20A-20G demonstrate various views of the wall plate according to embodiments of the present disclosure.
Figure 20B:
Figure 20C:
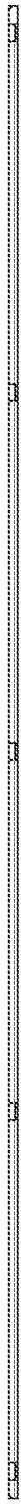
Figure 20D:
Figure 20E:
Figure 20F:
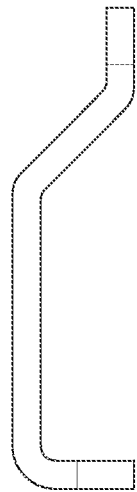
Figure 20G:
Figure 21A:
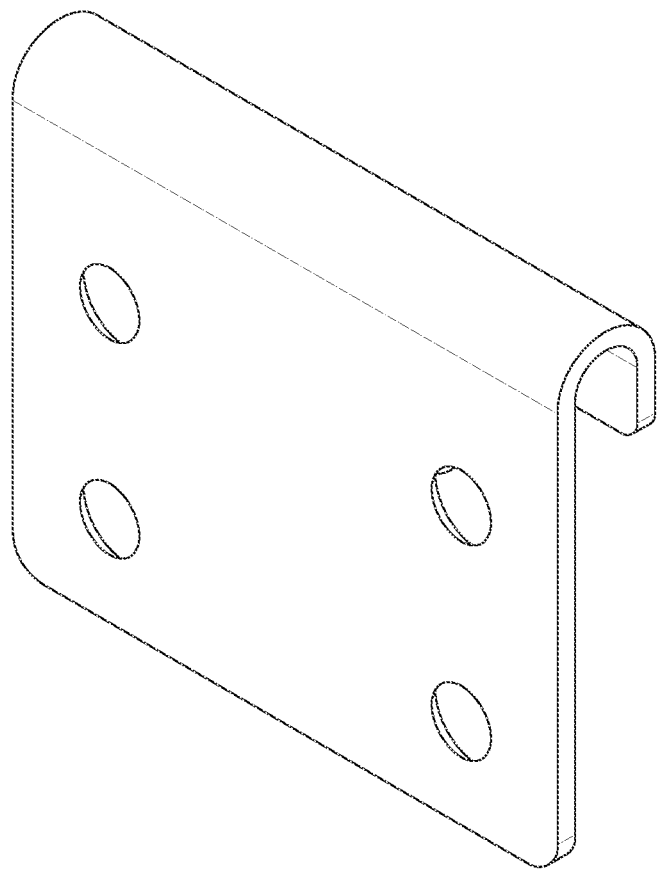
FIGS. 21A-21G demonstrate various views of the mounting clip according to embodiments of the present disclosure.
Figure 21B:
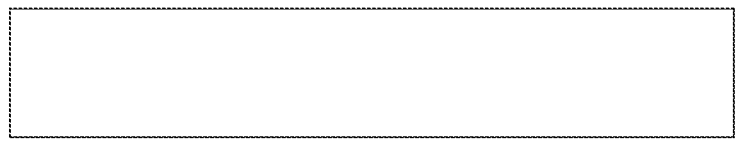
Figure 21C:
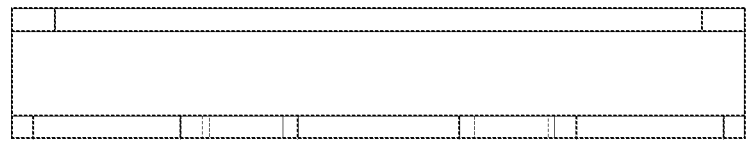
Figure 21E:
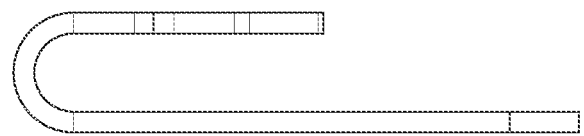
Figure 21D:
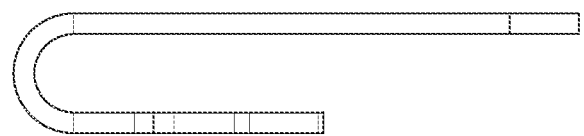
Figure 21F:
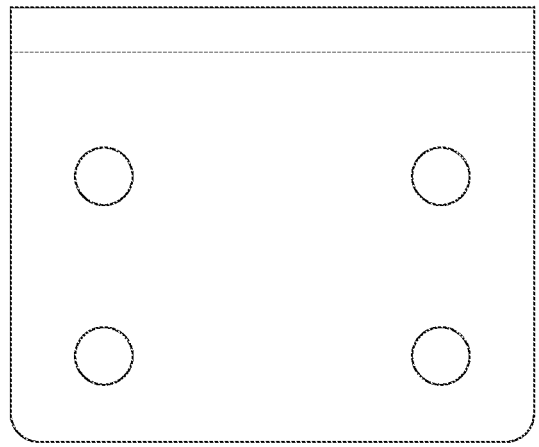
Figure 21G:
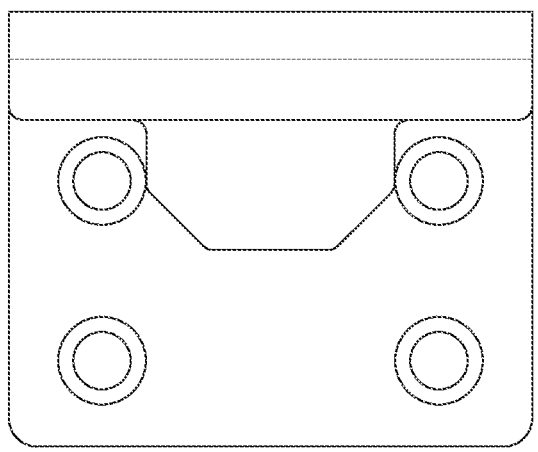

FIG. 17 demonstrates a method 1200 for assembling the assembly 1100 according to embodiments of the present disclosure. At block 1201, the method 1200 may include securing the wall plate to the wall. As described herein, in some embodiments, the wall plate may be lowered atop a plurality of fasteners, such as screws, which are secured to the wall.

At block 1202, the method 1200 may include coupling the faceplate to the wall plate by rotating the faceplate onto the wall plate, as described above. In other embodiments, the plurality of ridges are slid against the interior of the wall plate as the faceplate moves horizontally relative to the wall plate. In some embodiments, the upper lip of the faceplate extends over the free end of the wall plate.

At block 1203, the method 1200 may include coupling the mounting clip to the faceplate and/or the wall plate. In some embodiments, the mounting clip extends through the clip opening of the wall plate.

In other embodiments, the faceplate and the wall plate may first be coupled together, and then secured to the wall by the fasteners. This could be accomplished by providing clearance holes in the faceplate to allow for tool access to the hidden fasteners. Embodiments herein are not limited in this context.

FIGS. 18A-18G demonstrate various views of the assembly 1100 according to embodiments of the present disclosure.

FIGS. 19A-19G demonstrate various views of the faceplate 1104 according to embodiments of the present disclosure.

FIGS. 20A-20G demonstrate various views of the wall plate 1102 according to embodiments of the present disclosure.

FIGS. 21A-21G demonstrate various views of the mounting clip 1107B according to embodiments of the present disclosure.

The foregoing discussion has been presented for purposes of illustration and description and is not intended to limit the disclosure to the form or forms disclosed herein. For example, various features of the disclosure may be grouped together in one or more aspects, embodiments, or configurations for the purpose of streamlining the disclosure. However, it should be understood that various features of the certain aspects, embodiments, or configurations of the disclosure may be combined in alternate aspects, embodiments, or configurations. Moreover, the following claims are hereby incorporated into this Detailed Description by this reference, with each claim standing on its own as a separate embodiment of the present disclosure.

The use of "including," "comprising," or "having" and variations thereof herein is meant to encompass the items listed thereafter and equivalents thereof as well as additional items. Accordingly, the terms "including," "comprising," or "having" and variations thereof are open-ended expressions and can be used interchangeably herein.

The phrases "at least one", "one or more", and "and/or", as used herein, are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present disclosure, and do not create limitations, particularly as to the position, orientation, or use of this disclosure. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other.

Furthermore, identification references (e.g., primary, secondary, first, second, third, fourth, etc.) are not intended to connote importance or priority, but are used to distinguish one feature from another. The drawings are for purposes of illustration only and the dimensions, positions, order and relative sizes reflected in the drawings attached hereto may vary.

Furthermore, the terms "substantial" or "substantially," as well as the terms "approximate" or "approximately," can be used interchangeably in some embodiments, and can be described using any relative measures acceptable by one of ordinary skill in the art. For example, these terms can serve as a comparison to a reference parameter, to indicate a deviation capable of providing the intended function. Although non-limiting, the deviation from the reference parameter can be, for example, in an amount of less than 1%, less than 3%, less than 5%, less than 10%, less than 15%, less than 20%, and so on.

Still furthermore, although the illustrative methods described above as a series of acts or events, the present disclosure is not limited by the illustrated ordering of such acts or events unless specifically stated. For example, some acts may occur in different orders and/or concurrently with other acts or events apart from those illustrated and/or described herein, in accordance with the disclosure. In addition, not all illustrated acts or events may be required to implement a methodology in accordance with the present disclosure. Furthermore, the methods described herein may be implemented in association with the formation and/or processing of structures illustrated and described herein as well as in association with other structures not illustrated.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Furthermore, the present disclosure has been described herein in the context of a particular implementation in a particular environment for a particular purpose. Those of ordinary skill in the art will recognize the usefulness is not limited thereto and the present disclosure may be beneficially implemented in any number of environments for any number of purposes. Thus, the claims set forth below are to be construed in view of the full breadth and spirit of the present disclosure as described herein.

What is claimed is:

1. An assembly, comprising:
   a wall plate operable to be secured to a structure, the wall plate comprising:
      a first section extending parallel to a plane defined by the structure;
      a second section extending from a first end of the first section, wherein the second section includes a free end; and
      a third section extending from a second end of the first section, wherein the third section is oriented substantially perpendicular to the first section; and
   a faceplate removably coupled to the wall plate, the faceplate comprising:
      an outer side opposite an inner side, wherein a plurality of ridges extend towards the wall plate from the inner side, and wherein the plurality of ridges comprise:
         a first ridge in abutment with the second section of the wall plate;
         a second ridge in abutment with the first section of the wall plate, wherein the second ridge extends farther from the inner side than the first ridge; and
         a third ridge extending beneath the third section of the wall plate.

2. The assembly of claim 1, wherein the wall plate further comprises a clip opening extending through at least one of the first section and the second section.

3. The assembly of claim 2, further comprising a mounting clip coupleable with the faceplate, the mounting clip comprising:
   a main section positioned adjacent the outer side of the faceplate; and
   an overlap section extending from the main section, the overlap section operable to extend over an upper end of the faceplate.

4. The assembly of claim 3, wherein the overlap section extends through the clip opening.

5. The assembly of claim 1, wherein the wall plate further comprises a plurality of fastener openings extending through at least one of the first section and the third section, wherein a fastener is operable to extend through one of the plurality of fastener openings to secure the wall plate to the structure.

6. The assembly of claim 5, wherein the structure is an interior wall.

7. The assembly of claim 1, wherein the faceplate further comprises an upper lip operable to extend over the free end of the second section of the wall plate.

8. The assembly of claim 1, wherein the third section of the wall plate is in abutment with the inner side of the faceplate.

9. The assembly of claim 1, wherein the second section of the wall plate extends at an angle towards the faceplate.

10. A mounting assembly, comprising:
    a wall plate operable to be secured to a wall, the wall plate comprising:
       a first section extending substantially parallel to a plane defined by a surface of the wall;
       a second section extending from a first end of the first section, wherein the second section includes a free end; and
       a third section extending from a second end of the first section, wherein the third section is oriented substantially perpendicular to the first section; and
    a faceplate removably coupled to the wall plate, the faceplate comprising:
       an outer side opposite an inner side, wherein a plurality of ridges extend towards the wall plate from the inner side, and wherein the plurality of ridges comprise:
          a first ridge in abutment with the second section of the wall plate;
          a second ridge in abutment with the first section of the wall plate, wherein the second ridge extends farther from the inner side than the first ridge; and
          a third ridge extending beneath the third section of the wall plate.

11. The mounting assembly of claim 10, wherein the wall plate further comprises a clip opening extending through at least one of the first section and the second section.

12. The mounting assembly of claim 11, further comprising a mounting clip coupleable with the faceplate, the mounting clip comprising:
    a main section positionable adjacent the outer side of the faceplate; and
    an overlap section extending from the main section, the overlap section operable to extend over an upper end of the faceplate.

13. The mounting assembly of claim 12, wherein the overlap section extends through the clip opening.

14. The mounting assembly of claim 10, wherein the wall plate further comprises a plurality of fastener openings extending through at least one of the second section and the third section, wherein a fastener is operable to extend through one of the plurality of fastener openings to secure the wall plate to the wall.

15. The mounting assembly of claim 10, wherein the faceplate further comprises an upper lip operable to extend over the free end of the second section of the wall plate.

16. The mounting assembly of claim 10, wherein the third section of the wall plate is in abutment with the inner side of the faceplate, and wherein the second section of the wall plate extends at an angle towards the faceplate.

17. A wall mounting system, comprising:
   a wall plate operable to be secured to a wall, the wall plate comprising:
      a first section extending parallel to a plane defined by a surface of the wall; and
      a second section extending from a first end of the first section, wherein the second section includes a free end, and wherein the free is oriented parallel to the first section; and
   a faceplate removably coupled to the wall plate, the faceplate comprising:
      an outer side opposite an inner side, wherein a plurality of ridges extend towards the wall plate from the inner side, and wherein the plurality of ridges comprise:
         a first ridge in abutment with the second section of the wall plate;
         a second ridge in abutment with the first section of the wall plate, wherein the second ridge extends farther from the inner side than the first ridge; and
         a third ridge extending beneath the wall plate.

18. The wall mounting system of claim 17, wherein the wall plate further comprises a clip opening extending through at least one of the first section and the second section, and a plurality of fastener openings extending through the second section.

19. The wall mounting system of claim 18, further comprising a mounting clip coupleable with the faceplate, the mounting clip comprising:
   a main section positioned adjacent the outer side of the faceplate; and
   an overlap section extending from the main section, the overlap section operable to extend over an upper end of the faceplate.

20. The wall mounting system of claim 19, wherein overlap section extends through the clip opening.

* * * * *